(12) United States Patent
Arneson et al.

(10) Patent No.: US 11,710,122 B2
(45) Date of Patent: Jul. 25, 2023

(54) USING A NESTED RANDOM NUMBER-BASED SECURITY ECOSYSTEM FOR BLOCK CHAINS FOR ELECTRONIC CASH TOKENS AND OTHER EMBODIMENTS

(71) Applicant: Matrics2, Inc., Warba, MN (US)

(72) Inventors: Michael R. Arneson, Warba, MN (US); William R. Bandy, Gambrills, MD (US)

(73) Assignee: MATRICS2, LLC, Warba, MN (US)

( * ) Notice: Subject to any disclaimer, the term of this patent is extended or adjusted under 35 U.S.C. 154(b) by 0 days.

(21) Appl. No.: 17/193,361

(22) Filed: Mar. 5, 2021

(65) Prior Publication Data

US 2021/0264413 A1 Aug. 26, 2021

Related U.S. Application Data

(63) Continuation of application No. 16/290,524, filed on Mar. 1, 2019, now abandoned.

(60) Provisional application No. 62/637,304, filed on Mar. 1, 2018.

(51) Int. Cl.
| | |
|---|---|
| G06Q 20/38 | (2012.01) |
| G06Q 20/02 | (2012.01) |
| G06Q 20/40 | (2012.01) |
| G06Q 40/04 | (2012.01) |
| G06Q 20/06 | (2012.01) |

(52) U.S. Cl.
CPC ........... *G06Q 20/389* (2013.01); *G06Q 20/02* (2013.01); *G06Q 20/0658* (2013.01); *G06Q 20/401* (2013.01); *G06Q 20/4012* (2013.01); *G06Q 20/40145* (2013.01); *G06Q 40/04* (2013.01); *G06Q 2220/00* (2013.01)

(58) Field of Classification Search
CPC .. G06Q 20/389; G06Q 20/02; G06Q 20/0658; G06Q 20/401; G06Q 20/4012; G06Q 20/40145; G06Q 40/04
See application file for complete search history.

(56) References Cited

U.S. PATENT DOCUMENTS

| | | | |
|---|---|---|---|
| 5,241,526 A | 8/1993 | Ishii | |
| 5,548,110 A | 8/1996 | Storch et al. | |
| 6,931,532 B1* | 8/2005 | Davis | G06F 21/6209 |
| | | | 705/76 |
| 9,135,787 B1* | 9/2015 | Russell | G07F 19/201 |
| 10,396,985 B1* | 8/2019 | Nagelberg | H04L 9/3247 |
| 2005/0097260 A1* | 5/2005 | McGovern | G06F 3/0623 |
| | | | 711/100 |
| 2015/0310476 A1 | 10/2015 | Gadwa | |
| 2016/0164884 A1* | 6/2016 | Sriram | G06Q 10/06315 |
| | | | 705/51 |
| 2017/0249622 A1 | 8/2017 | Ortiz et al. | |
| 2018/0025435 A1 | 1/2018 | Karame et al. | |
| 2018/0117446 A1 | 5/2018 | Tran et al. | |
| 2018/0130050 A1* | 5/2018 | Taylor | H04L 9/3236 |
| 2018/0165758 A1 | 6/2018 | Saxena et al. | |
| 2018/0303420 A1 | 10/2018 | Mauro et al. | |
| 2019/0034939 A1* | 1/2019 | Thomas | G06N 3/0445 |
| 2019/0198144 A1* | 6/2019 | Blackley | H04L 9/3239 |
| 2019/0272538 A1 | 9/2019 | Arneson et al. | |

\* cited by examiner

*Primary Examiner* — Scott C Anderson
(74) *Attorney, Agent, or Firm* — Weaver IP L.L.C.

(57) ABSTRACT

Methods, systems, and apparatuses for block chain security schemes for electronic cash tokens are described herein.

20 Claims, 18 Drawing Sheets

RNIDt3 DOCUMENTS THE TRANSFER OF $50.00 FROM BOB TO LINDA

USING A NESTED RANDOM NUMBER-BASED SECURITY ECOSYSTEM FOR BLOCK CHAINS FOR ELECTRONIC CASH TOKENS AND OTHER EMBODIMENTS

CROSS REFERENCE TO RELATED APPLICATIONS

This application is a continuation of U.S. patent application Ser. No. 16/290,524, filed on Mar. 1, 2019, which claims priority to U.S. Provisional Patent Application No. 62/637,304, filed on Mar. 1, 2018, the entireties of which are incorporated by reference.

BACKGROUND OF THE INVENTION

Field of the Invention

The present patent application relates to block chain security schemes for electronic cash tokens.

Background Art

A purpose of a block chain is to provide a complete historical record of all financial transactions that cannot be tampered with. A good example is the bitcoin block chain. The problem with this approach it has no links to financial institutions to track currency transactions. It also does not track individual transactions. It also is a public system and is prone to hacking.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses for block chain security schemes for electronic cash tokens, substantially as shown in and/or described herein in connection with at least one of the figures, as set forth more completely in the claims.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
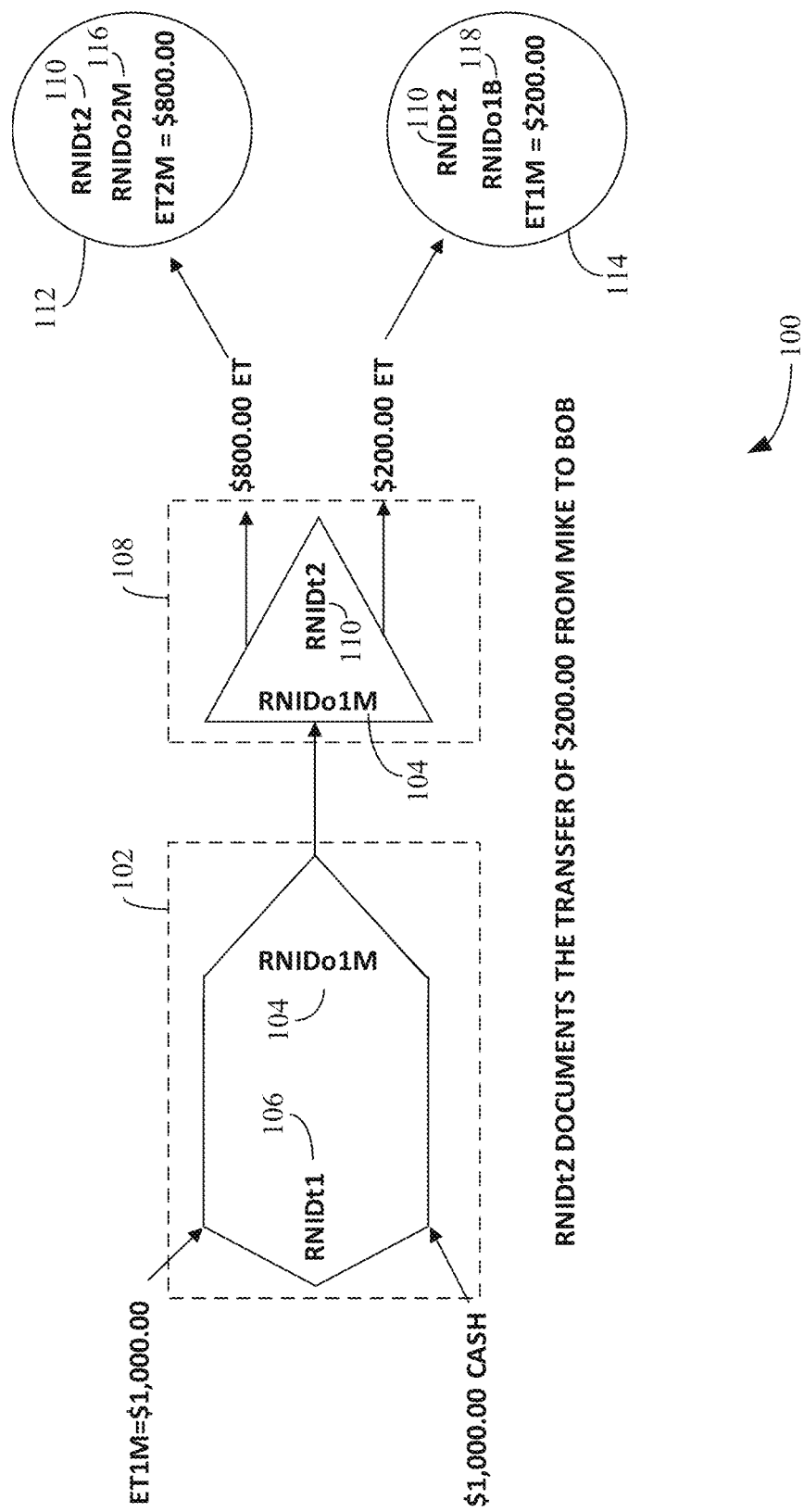
FIG. 1 depicts transaction and ownership blocks for purchase and transfer of Electronic Tokens in accordance with an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Example Embodiments

The example embodiments described herein are provided for illustrative purposes and are not limiting. Further structural and operational embodiments, including modifications/alterations, will become apparent to persons skilled in the relevant art(s) from the teachings herein.

A "block chain" or "block chain" is a sequence ("chain") of records (e.g., in a list), referred to as "blocks," that are linked using cryptography. Each block in the "chain" contains a cryptographic hash of the previous block, a timestamp, and transaction data. A block chain is intended to be a distributed ledger that can record transactions between two parties efficiently and in a verifiable way. Block chain was originally developed to serve as the public transaction ledger of the cryptocurrency known as "bitcoin." "Cryptocurrency" refers to digital assets designed to work as a medium of exchange that uses strong cryptography to secure financial transactions, control the creation of additional units of the assets, and verify the transfer of the assets. Block chain may be used, however, in any number and fields of business, including finance, manufacturing, product design, sales, etc., and embodiments described herein are applicable to any field and type of block chain.

An example block chain in the field of cryptocurrency may begin like this: A person enters a bank with a thousand dollars in one hundred-dollar bills, which he lays down on the counter and announces that he would like to buy an e-token (ET). The teller acknowledges and delivers to the person one ET worth one thousand dollars. The teller then puts the one thousand dollars in the cash drawer and enters the amount into an e-account, prints out a receipt, and hands it to the person. "This number here", the teller points to, "is the transaction number for the e-account, this number is your ownership number, proving you own the ET, and this number is the value of the ET, one thousand dollars. You will need this receipt for any further transactions with your ET. Anyone who walks in the door after you walk out with a receipt that has this transaction number, a valid ownership number, and an ET that is a derivative of yours (DT for short) can withdraw the cash his DT is worth." The person nods his head in understanding, pockets the receipt, and walks out the door, having just entered into the strange new world of electronic token financial transactions.

In an embodiment, to manage the ET, the person downloads a secure application (or "app") from a website, which comes with a unique randomly-generated ID number, or RNID for short, standing for Random Number ID. The number of bits in the RNID, for example, could be 256, or any other number of sufficient bits that would defy guessing the value of by any hacker using any computer of arbitrary size and computational capability. The app is designed to interface with any electronic token financial transaction, and so is called an etapp. The etapp interfaces securely with the Internet to act in the person's behalf to navigate the electronic token financial transaction world. How it performs this function will be explained in detail later. But first, a high-level view of the electronic token financial transaction world is in order.

First, all transactions and their ownership need to provide a traceable chain of ET transactions that is secure and irreversible. Two block types are defined, a transaction block and an ownership block. An ownership block will be identified by two RNIDs, one a newly generated ownership RNID for the block that the etapp retains for subsequent transactions, called an RNIDo (o is for ownership), which is associated with the ET value of the block in a secure RNID data base, and the second is the RNID of the transaction block that generated the new ownership block, called the RNIDt (t is for transaction).

The transaction block is identified by two RNIDs, a newly generated transaction block RNIDt, which is associated with details of the transaction, and the ownership RNIDo of the previous block the transaction block is derived from. This will become clear from the following explanations. The generation of these blocks must be irreversible to ensure security and integrity of each of the block chains. A write-once-read-many, (WORM) or Read Only Memory (ROM) may be used to ensure that once defined they cannot be changed.

Example functionality of these blocks is now described with reference to FIG. 1. FIG. 1 depicts transaction and ownership blocks for purchase and transfer of Electronic Tokens in accordance with an example embodiment. As shown in FIG. 1, the chain includes an initial starting block 102, and is a hybrid of the transaction and ownership blocks. It is identified by two RNIDS, the RNIDo1M 104 (where is representative of the owner of the block ("Mike")) and the RNIDt1 106, which is associated with the financial transaction details of how the ET1 was purchased, including the details of the financial institution holding the cash value of the ET1. For example, let's say the ET was purchased by individual (person) "1" Mike for $1,000, so the RNIDs for individual "1" Mike's starting block are RNIDo1M 104 and RNIDt1 106. This transaction is shown in the first block of FIG. 1. RNIDo1M is stored in Mike's smart phone or device by his etapp for reference for a subsequent transaction. To redeem cash from Individual "1" Mike's ET Ownership account RNIDo number (i.e., RNIDo1M 104) must be presented to any participating authorized financial institution.

So now individual "1" Mike wants to transfer $200 to Individual "2" Bob who has no previous ownership block. A transaction block 108 is created identified by two RNIDs, RNIDo1M 104 and RNIDt2 110, where RNIDt2 110 is associated in the data base with the details of the transaction, which simply specifies the electronic transfer worth $200 to individual "2" Bob, or 200ET, leaving 800ET in Individual "1" Mike's electronic account. The 200ET to Individual "2"

Bob is identified as a DT traceable to individual "1" Mike, in the transaction details associated with RNIDt2 110 and is referred to as 200DTMike. From this transaction block 108, two ownership blocks 112 and 114 are created, one for individual "1" Mike (transaction block 112) and the other for individual "2" Bob (transaction block 114) with values ET2Mike=$800 and ET1Bob=$200, each identified by two RNIDS. Individual "1" Mike's new block 112 would have RNIDo2M 116 and RNIDt2 110. Individual "2" Bob's new block 114 would have RNIDo1B 118 (where "B" stands for the individual's name "Bob"), and RNIDt2 110. Individual "1" Mikes etapp replaces his old RNIDo1M 104 with his new RNIDo2M 116 for a subsequent transaction and individual "2" Bob's etapp loads in individual "2" Bob's newly created RNIDo1B 118 for a subsequent transaction.

From the user's perspective this process looks simply like an ET transfer from the user's phone (e.g., Mike's phone) to the phone of the person receiving the ET (e.g., Bob's phone). For example, Mike would command his phone etapp to transfer 200ET to Bob (who is in Mike's contact list of people who have the etapp app), and Mike's phone would simply display the message "done", and Bob's phone would display "Mike has just transferred 200ET to you." They would not be aware of any of the background processing described above to achieve this transaction.

Figure 2:
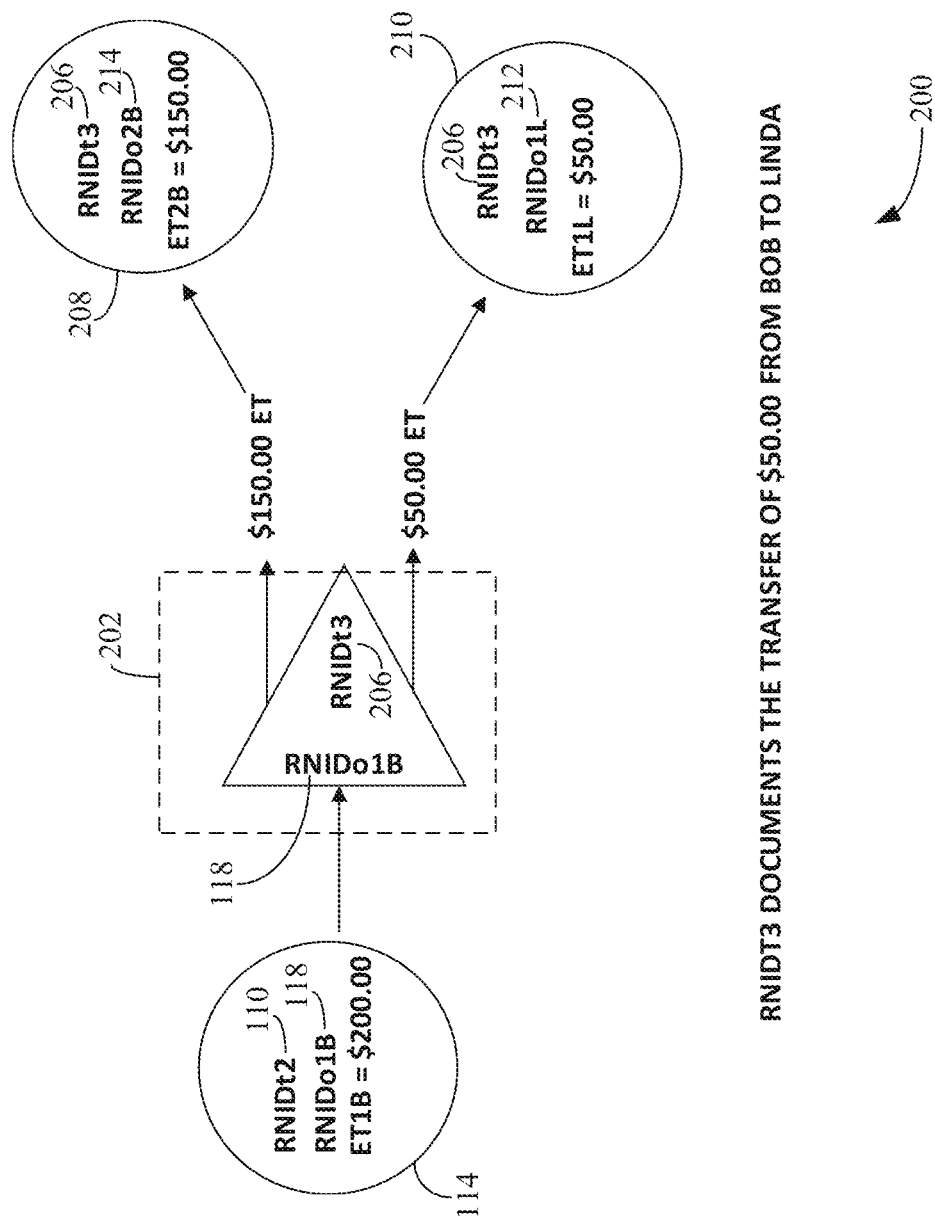
FIG. 2 depicts transferring ETs from one person to another in accordance with an example embodiment.

Individual "2" Bob could then transfer some of his ET value to someone else with the same process as above, by the creation of a transfer block, which then spins off two new ownership blocks. The foregoing is described in FIG. 2. FIG. 2 depicts transferring ETs from one person to another in accordance with an example embodiment. Let's say Bob wants to transfer $50 to individual "3" Linda who has no previous ownership block. A transaction block 202 is created identified by two RNIDS, RNIDo1B 118 and RNIDt3 206, where RNIDt3 206 is associated in the data base with the details of the transaction, which specifies the details of the electronic transfer worth $50 to individual "3" Linda, or 50ET, leaving 150ET in individual "2" Bob's account. Since the 50ET is derived from the 200DTMike, it is identified as 50DTMike in the data base associated with RNIDt3 206. From this transaction block 202, two ownership blocks 208 and 210 are created, one for individual "2" Bob and the other for individual "3" Linda with values of ET2Bob=$150 and ET1Linda=$50, each identified by two RNIDs. Individual "2" Bob's new block 208 would have RNIDo2B 214, and RNIDt3 206. Individual "3" Linda's new block 210 would have RNIDo1L 212 (where "L" represents the individual's name "Linda"), and RNIDt3 206 and her etapp loads in her newly created RNIDo1L 212 for a subsequent transaction. Individual "2" Bob's etapp replaces RNIDo1B 118 with the newly created RNIDo2B 214 in his smart phone for a subsequent transaction.

Figure 3:
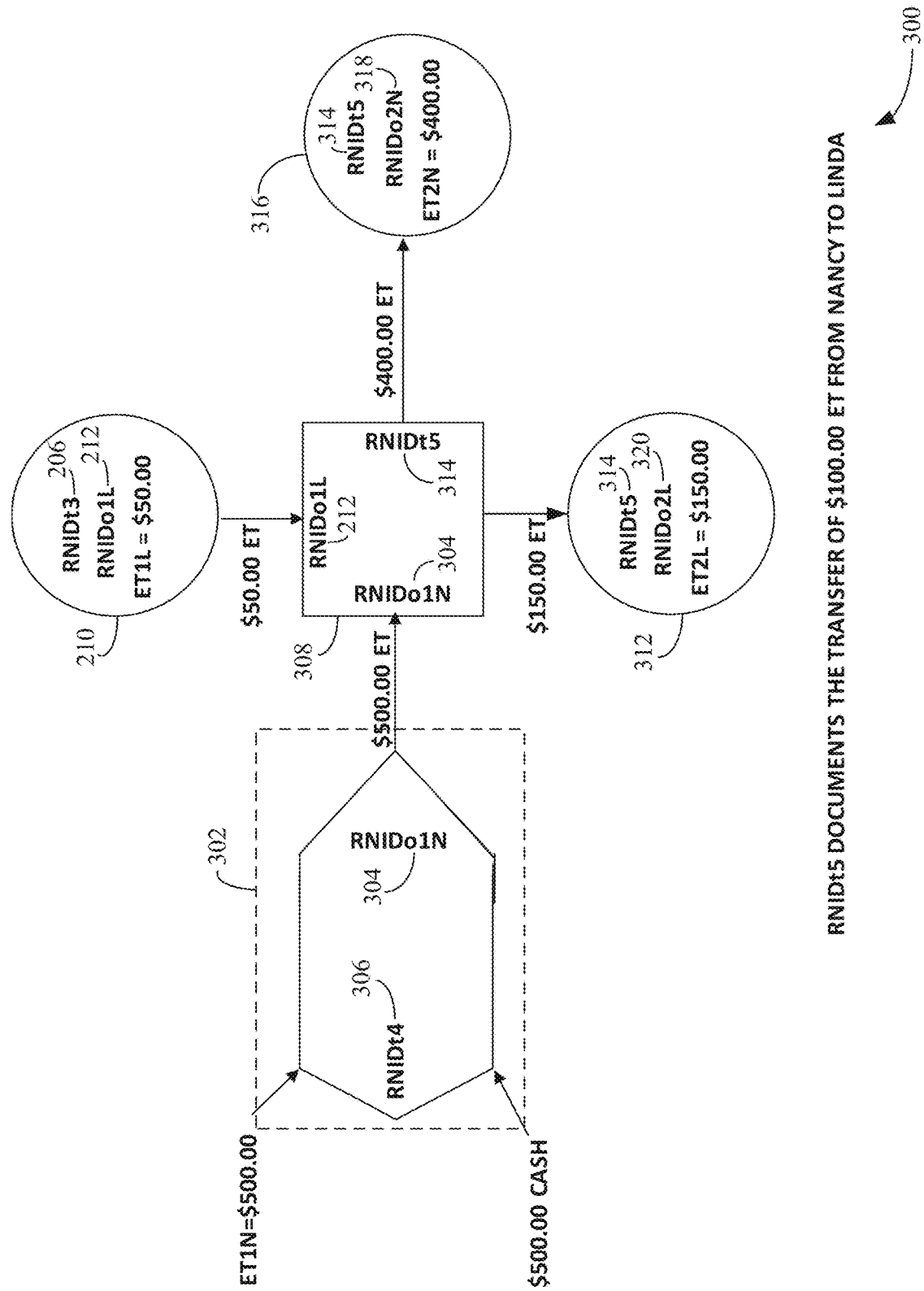
FIG. 3 depicts the purchase and transfer of ETs from one person to another in accordance with another example embodiment.

Now, suppose individual "4" Nancy goes to her bank and buys an ET for $500. The foregoing is shown in FIG. 3. FIG. 3 depicts the purchase and transfer of ETs from one person to another in accordance with another example embodiment Nancy's starting block 302 is identified by the RNIDs, RNIDo1N 304 (where "N" represents the individual "Nancy") and RNIDt4 306 with ET1N=$500 and her bank holding an ET cash account of $500. She wishes to transfer $100 to Individual "3" Linda, so a transaction block 308 is created but now with inputs from two ownership blocks 302 and 310, the one from individual "4" Nancy and the one from individual "3" Linda's. This transaction block 308 is referred to as a merged transfer identified with three RNIDs, RNIDo1N 304, RNIDo1L 212 and RNIDt5 314. From this merged transaction block 308 are created two new ownership blocks 316 and 312. The one for individual "4" Nancy (block 316) has the RNIDs RNIDo2N 316 and RNIDt5 314 with ET2N=$400. The one for individual "3" Linda (block 312) is identified by RNIDo2L 320 and RNIDt5 314 with ET2L=$50+$100=$150. RNIDt5 314 is associated with the details of this transaction in the secure RNID database and will be further discussed in more detail below. Since the 100ET is derived from individual "4" Nancy, it is identified as 100DTNancy in the database associated with RNIDt5 314.

Figure 4A:
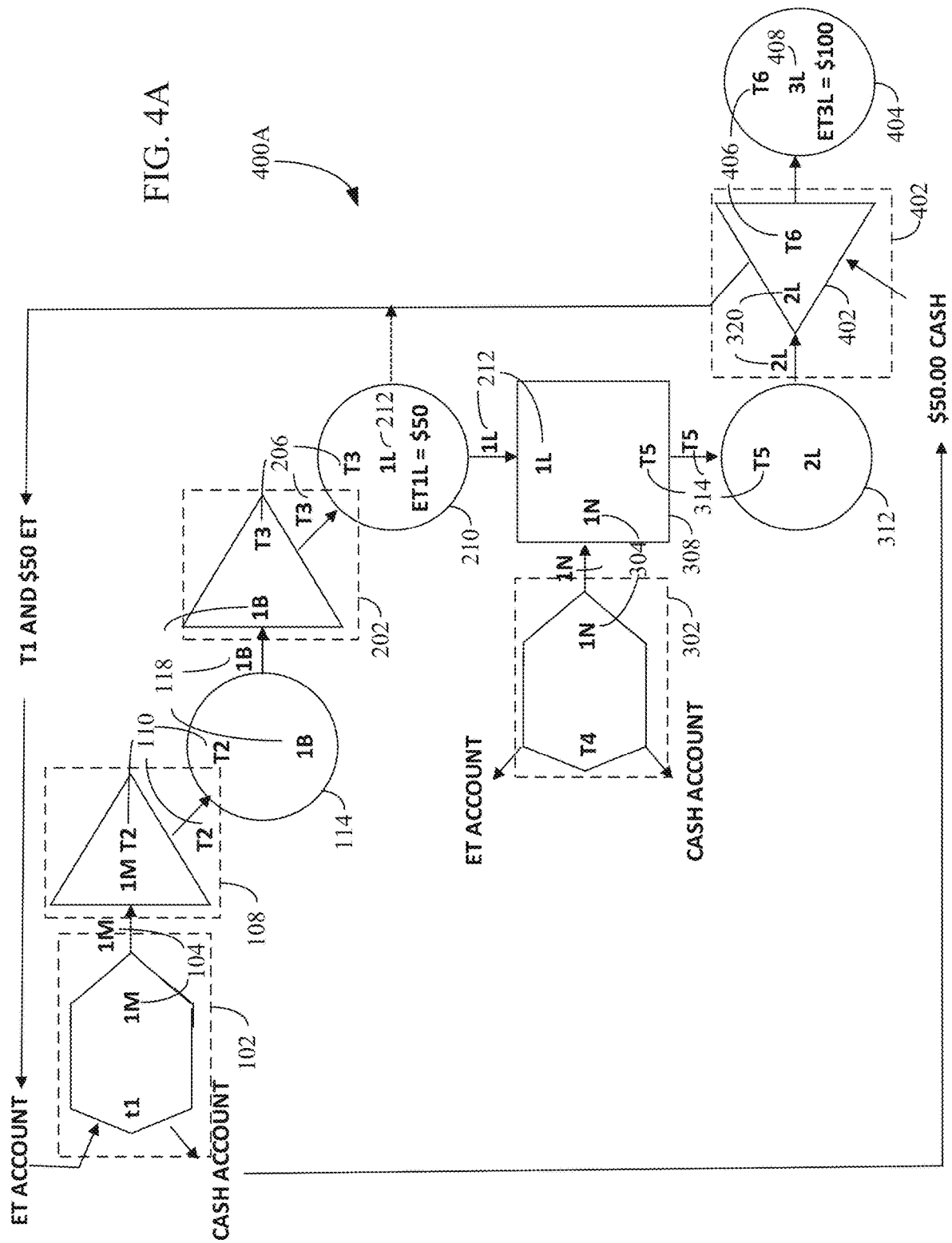
FIG. 4A depicts one back-chain pathway to redeem ETs in accordance with an example embodiment.

FIG. 4A depicts one back-chain pathway 400A to redeem ETs in accordance with an example embodiment. For example, suppose individual "3" Linda would like to convert some of her ET value to cash, say $75. Her etapp logs on to her bank with the request along with her RNIDo2L 320 (shown as "2L" in FIG. 4A for brevity) which the bank uses to enter the electronic transfer chain and finds individual "3" Linda's ownership block 312, which contains the RNIDt5 314 (shown as "T5" in FIG. 4A for brevity) of the previous transfer block, which is a merged transfer block 308 with three RNIDs, RNIDo1N 304 (shown as "1N" in FIG. 4 for brevity), RNIDo1L 212 (shown as "1L" in FIG. 4A for brevity), and RNIDt5 314. The back-chain program will traverse older paths first and so follows the chain identified by RNIDo1L 212 which takes her to the ownership block 210 with the RNIDs RNIDo1L 212 and RNIDt3 206 (shown as "T3" in FIG. 4A for brevity) with ET1Linda=$50, which is the redeemable value for that chain. The back-chain routine then uses RNIDt3 206 to go to the transfer block 202 identified by RNIDt3 206 and RNIDo1B 118 (shown as "1B" in FIG. 4A for brevity). It uses RNIDo1B 118 to go to the ownership block 114 identified by RNIDo1B 118 and RNIDt2 110 (shown as "T2" in FIG. 4A for brevity). It uses RNIDt2 110 to go to the transfer block 108 identified by RNIDt2 110 and RNIDo1M 104 (shown as "1M" in FIG. 4A for brevity). Now it uses RNIDo1M 104 to go to the ownership block 102 identified by RNIDo1M 104 and RNIDt1 106 (shown as "t1" in FIG. 4A for brevity). This is the starting block 102, so the program now presents the bank with RNIDt1 106, which is associated with the account number of the cash account along with financial transaction details and an ET worth $50, which authorizes the transfer of $50 from the ET cash account into Linda's bank account and the transfer of the $50 ET into the banks ET account. On doing so it creates a transaction block 402 identified by RNIDo2L 320 and RNIDt6 406 (shown as "T6" in FIG. 4A for brevity) associated with the details of the transaction with Mike's bank and sets DTMike=0 which zeroes out the value of the path just traversed so that in the future it won't be traversed again. A new ownership block 404 is then created identified by RNIDt6 406 and RNIDo3L 408 (shown as "3L" in FIG. 4A for brevity) with value ET3L=$100, and individual "3" Linda's etapp loads the new RNIDo3L 408 into her smart phone or device for a future transaction.

Figure 4B:
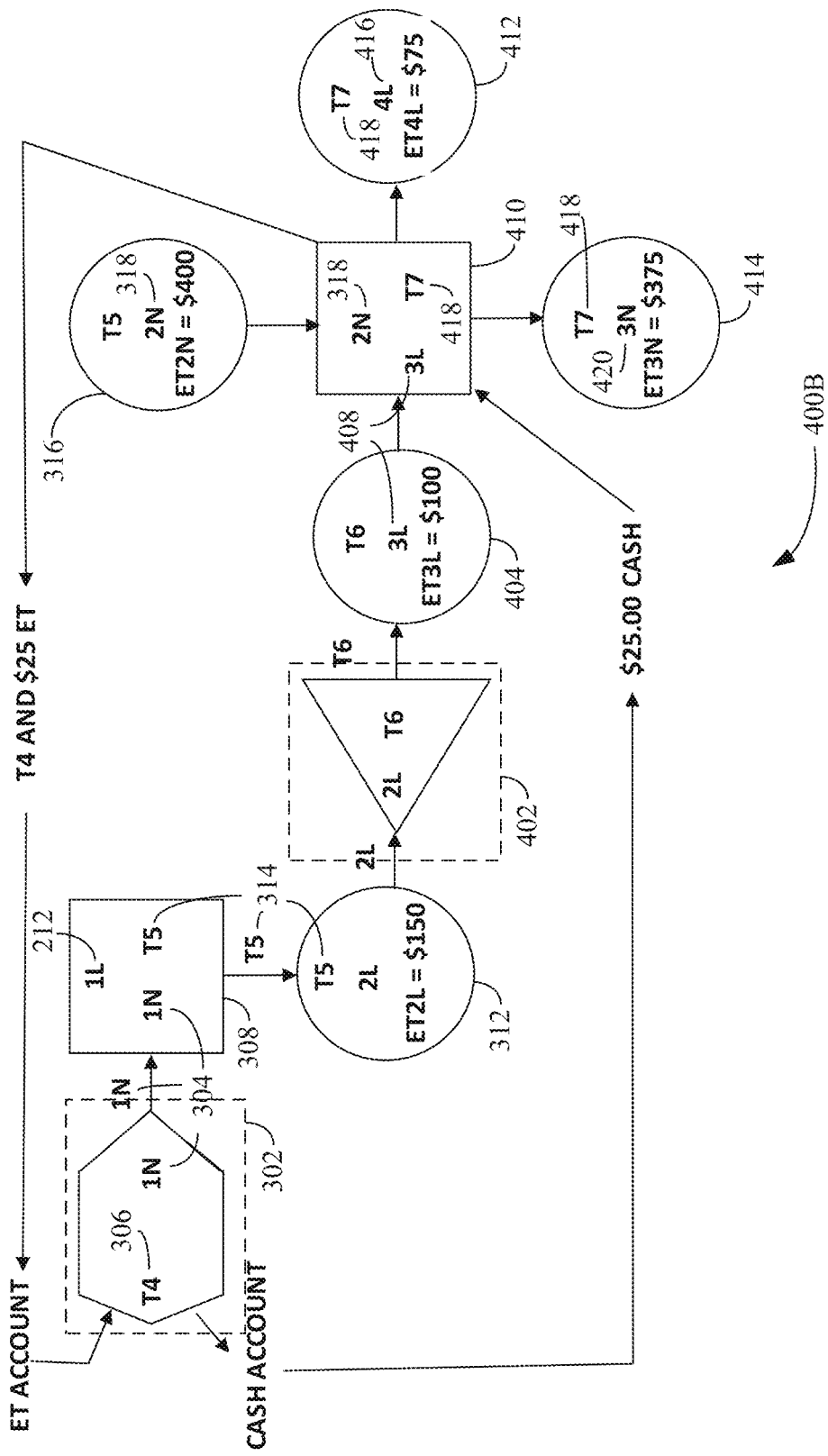
FIG. 4B depicts a second back-chain pathway to redeem ETs in accordance with an example embodiment.

FIG. 4B depicts a second back-chain pathway 400B to redeem ETs in accordance with an example embodiment. In the example shown in FIG. 4B, the back-chain program traverses this path back to the merged transfer block 308 with three RNIDs, RNIDo1N 304 (shown as "1N" in FIG. 4B for brevity), RNIDo1L 212 (shown as "1L" in FIG. 4B for brevity), and RNIDt5 314 (shown as "T5" in FIG. 4B for brevity). It uses RNIDt5 314 to discover in the accounting data that a $100 ET was transferred from RNIDo1N 304, so it now follows the chain identified by RNIDo1N 304 to the starting block 304 identified by RNIDo1N 304 and RNIDt4 306 (shown as "T4" in FIG. 4B for brevity). It then presents individual "4" Nancy's bank the ET cash account number associated with RNIDt4 306 with a request to transfer $25 to individual "3" Linda's bank cash account and transfers a $25 ET to individual "4" Nancy's bank ET account. It then creates a merged transfer block 410 recording that transaction with RNIDs RNIDo3L 408, RNIDo2N 318 (shown as "2N" in FIG. 4B for brevity) and RNIDt7 418 (shown as "T7" in FIG. 4B for brevity), then new ownership blocks 412 and 414 identified by RNIDt7 418 and RNIDo4L 416 (shown as "4L" in FIG. 4B for brevity) with ET4L=$75 for individual "3" Linda and RNIDt7 418 and RNIDo3N 420 (shown as "3N" in FIG. 4B for brevity) with ET3N=$375 for individual "4" Nancy. The derivative ET value for Linda is now 75DTNancy. The new RNIDo4L 416 is then loaded into individual "3" Linda's smart phone for a subsequent transaction and likewise RNIDo3N 420 is loaded into individual "4" Nancy's smart phone. All transactions could also work with any authorized ATM.

Figure 5:
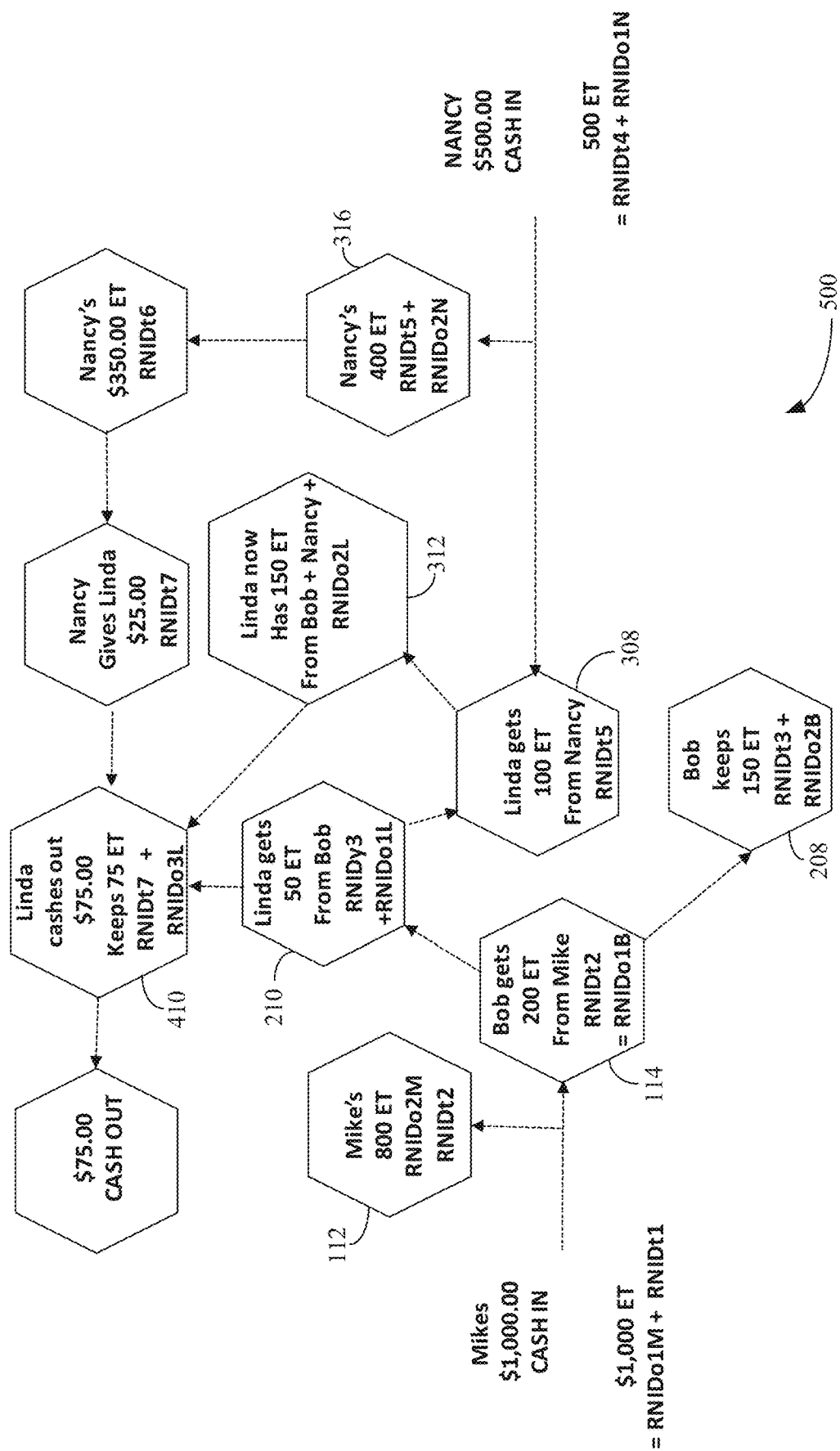
FIG. 5 is a short-hand view of all the transaction of FIGS. 1-4B.

FIG. 5 shows a high-level shorthand view 500 of all the transactions of described above with reference to FIGS. 1-4B, where the detail of the transaction and ownership blocks are omitted to make it easier to follow the transactions. This convention will be followed for the remainder of the specification. In that vein, FIGS. 6 and 7A-7B illustrate the complete chain of cash in to cash out through various ET transactions.

Figure 6:
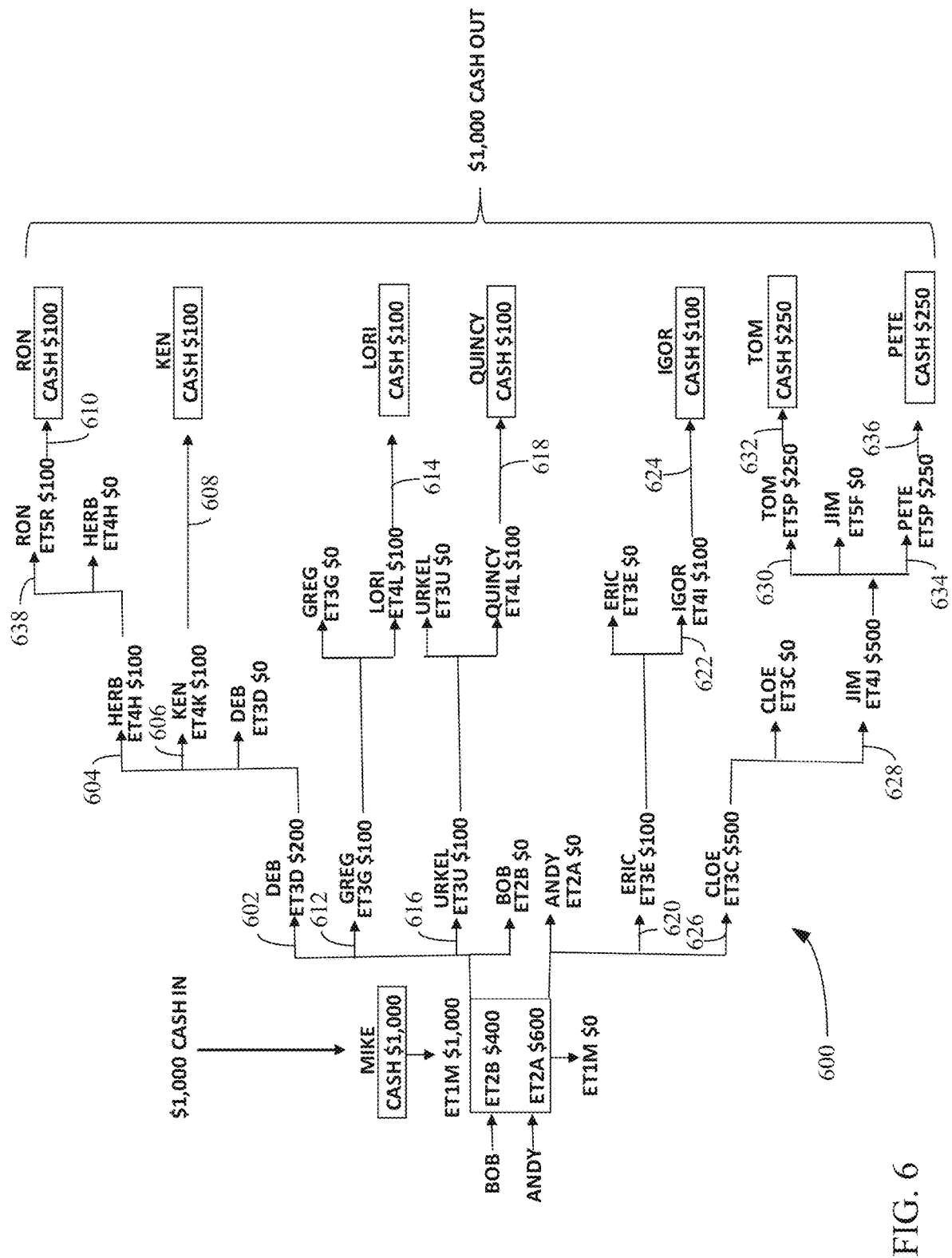
FIG. 6 is a shorthand diagram illustrating various transaction blocks for redeeming the electronic tokens for cash, as well as the schematic showing the complete redemption in the DT chain in accordance with to an example embodiment.
Figure 7A:
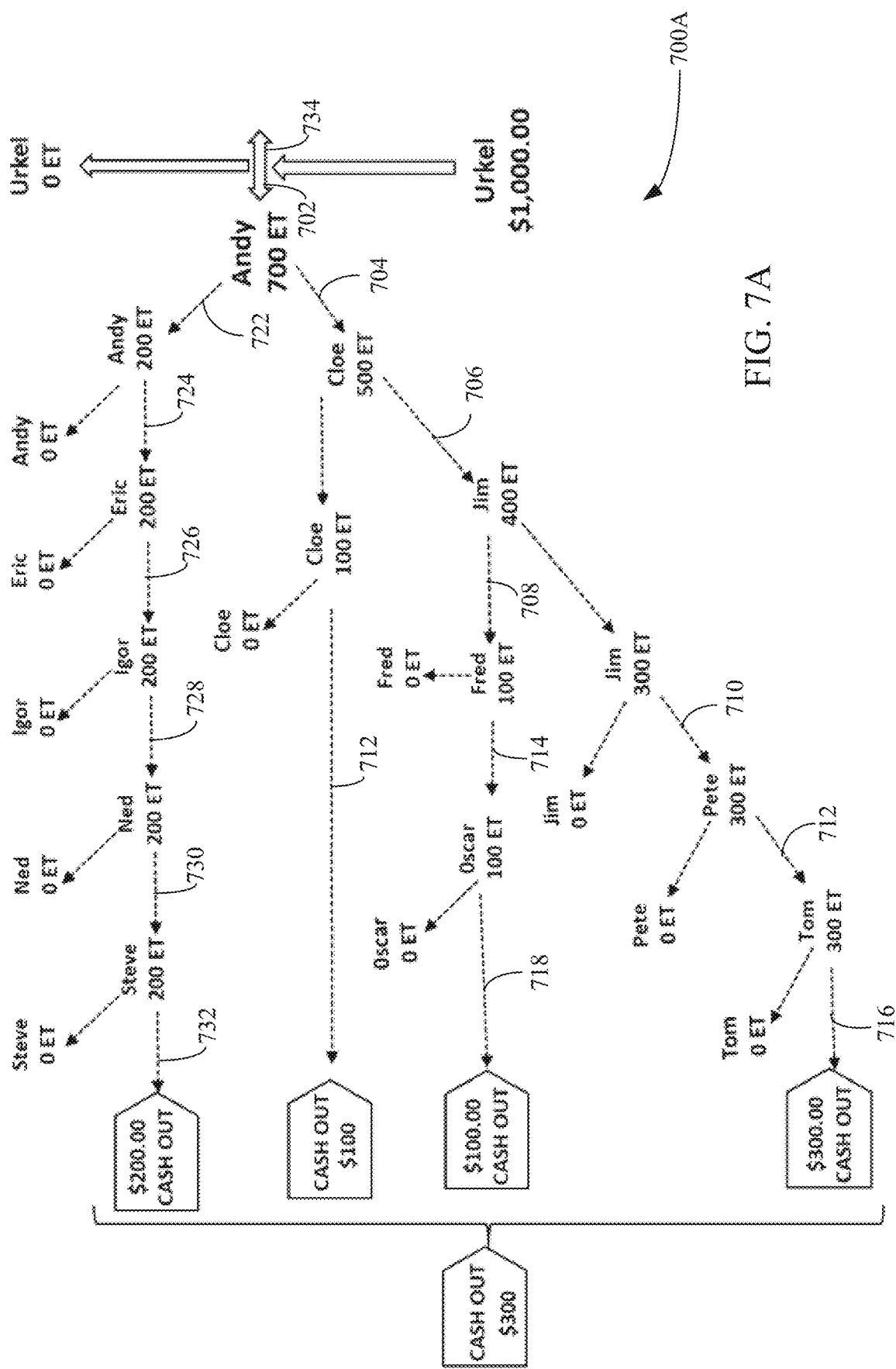
FIGS. 7A-7B depict another view of the complete cash in to cash out ET chain in accordance with to an example embodiment.
Figure 7B:
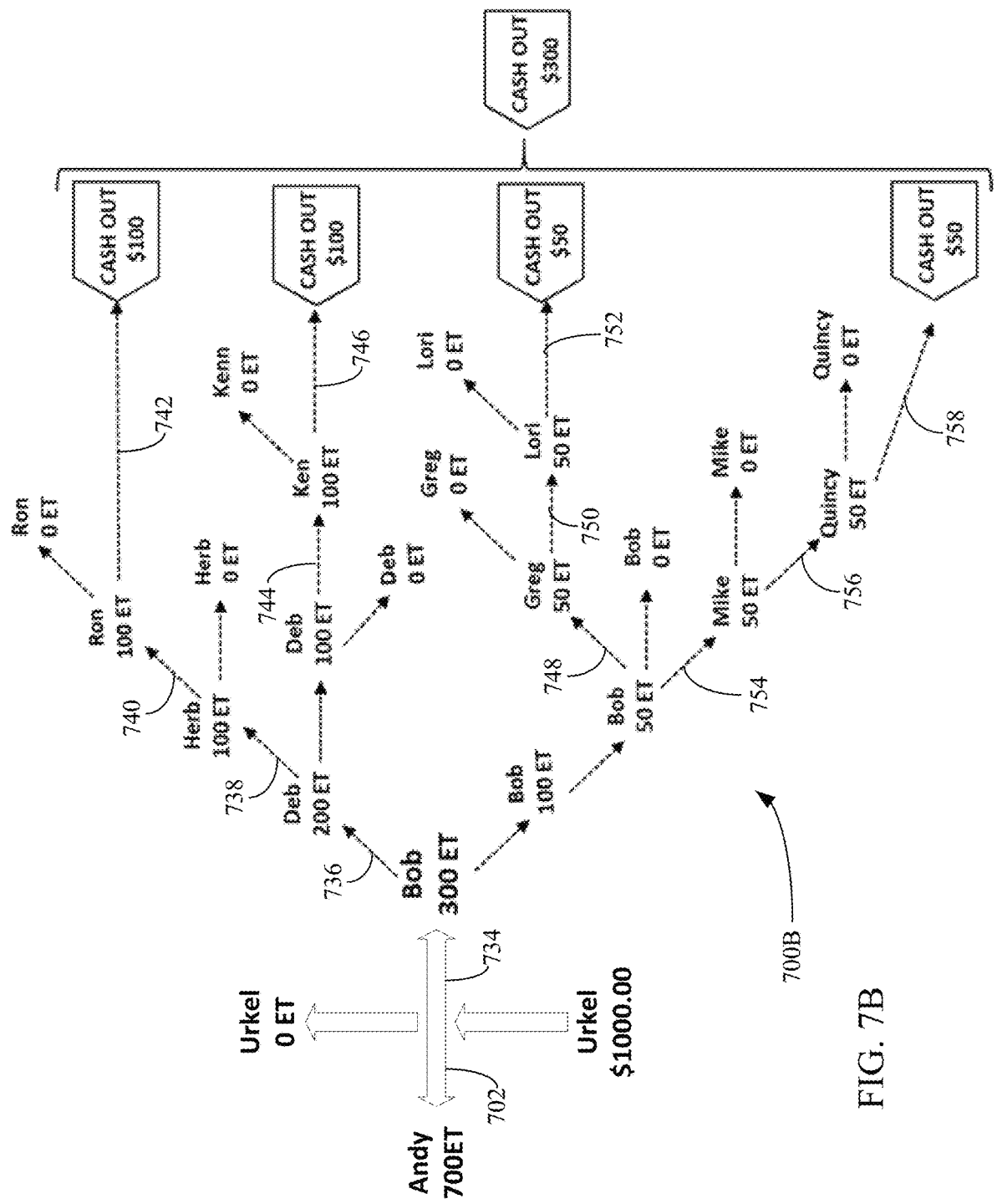

In particular FIG. 6 is a shorthand diagram 600 illustrating various transaction blocks 602, 604, 606, 608, 610, 612, 614, 616, 618, 620, 622, 624, 626, 628, 630, 632, 634, 636, and 638 for redeeming the electronic tokens for cash, as well as the schematic showing the complete redemption in the DT chain in accordance with to an example embodiment. FIGS. 7A-7B depict another view 700A-700B of transactions 702, 704, 706, 708, 710, 712, 714, 716, 718, 720, 722, 724, 726, 728, 730, 732, 734, 736, 738, 740, 742, 744, 746, 748, 750, 752, 754, 756, and 758 representative of complete cash in to cash out ET chain in accordance with to an example embodiment.

The creation of the transaction and ownership blocks described herein are irreversible, such as by use of WORM or ROM memory, preventing hacking changes. So, it is imperative that the protocols leading to the creation of these blocks are done securely to prevent unauthorized access to and use of the ET system. There are several ways to accomplish this objective.

Figure 8:
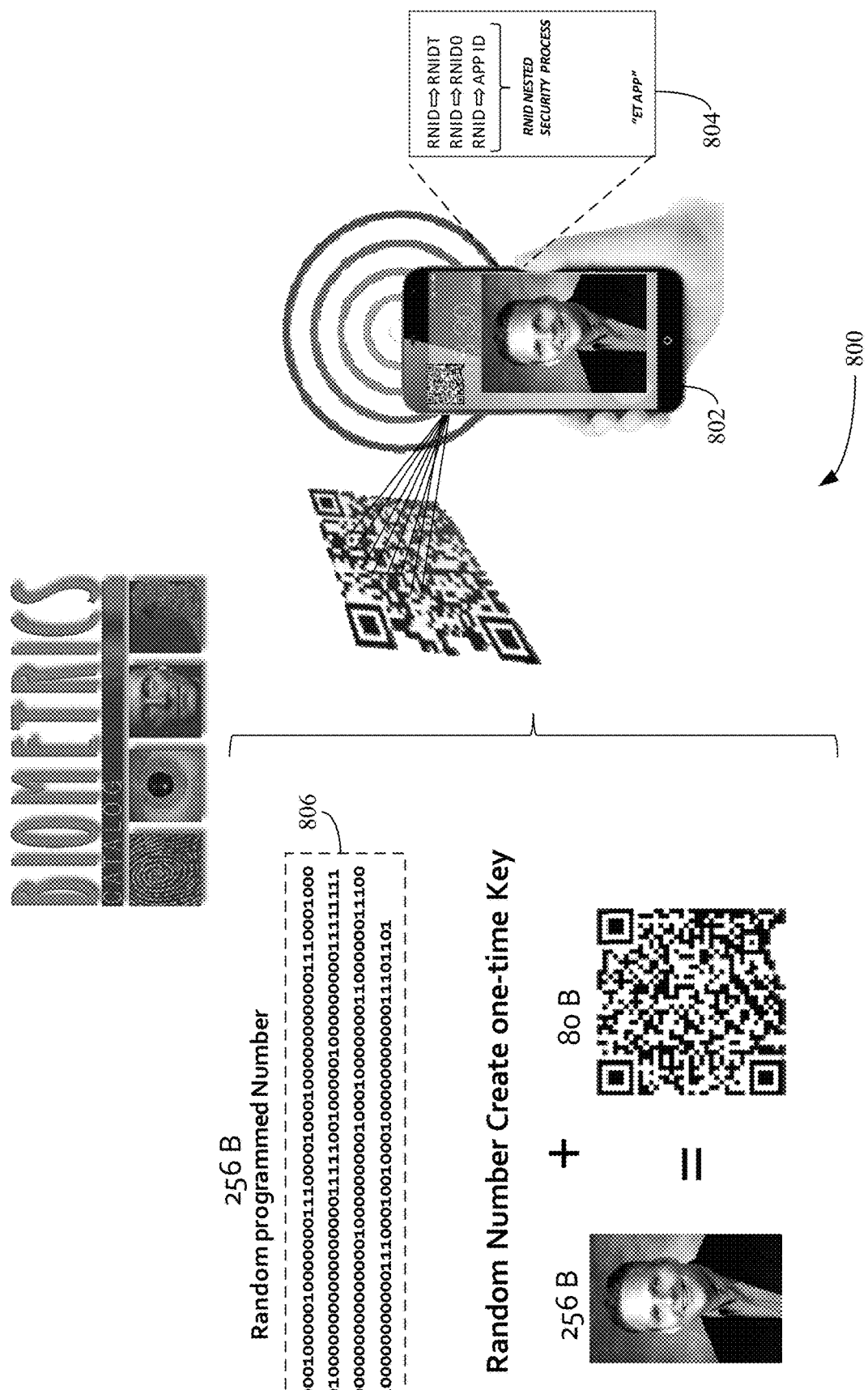
FIG. 8 depicts a diagram illustrating a mobile device that is configured to use the electronic token system in accordance with an example embodiment.

FIG. 8 depicts a diagram illustrating a mobile device 802 that is configured to use the electronic token system via an etapp 804 in accordance with an example embodiment. First is the use of a public/private key crypto security protocol to exchange data files. A user who desires to use the ET system, be it an individual, authorized entity or a financial institution, will log onto the public ET web site with the computing device (e.g. mobile device 802) to be used to access the system. If it is an individual it could be their smart phone 802. If it is a bank, credit union, or any other authorized financial institution, it would mostly likely be the computer that supports financial transactions within the institution and other outside authorized institutions. After log-on, they would be required to set up an account, with their user name, email address, a password, a biometric, etc. They will then receive a text message or email with a one-time passcode to enter for downloading the etapp 804, which is imbedded with an RNID 806 and the private/public key crypto security protocol. The private key is a derivative of its RNID 806. Then the user is logged off. Once downloaded the etapp 804 collects the smart phone 802, or computer specific identification numbers to create a device ID (DID) and encodes it with the ET system public key, logs on to the secure ET network with its RNID 806, and uploads the file. The ET decrypts the file and with the etapp RNID 806 sets up a unique and specific device/etapp logon password, which is then encoded and sent back to the etapp 804, which decodes it and stores it for future access to the ET system. Now the etapp 804 asks the user to re-enter the device PIN and starts collecting fingerprint, facial, iris, retina voice print, signature, etc. and/or other biometric data for future authentication of the authorized user of the device. This will prevent unauthorized users from accessing the device's etapp 804. The result is a two-step user/device/etapp authentication for log-on to the ET system. First, the etapp 804 may recognize the user as the authorized user, and then the ET system log-on has to recognize the device/etapp password as legitimate. Now the user is ready to use the ET system.

User interface to the etapp 804 is greatly facilitated with a "smart" etapp having language understanding with voice input, as described in U.S. patent application Ser. No. 15/843,806, filed on Dec. 15, 2017, and entitled "Product Data Interface Through a Personal Assistance Software Agent using Random Number Identifiers (RNIDs)". Although not necessary for the embodiments described herein it will be assumed the etapp 804 has this capability for further explanation below. Such an etapp facilitates functions such as transferring ETs to a select group of individuals in the user's address book.

For a bank, or any other financial institution, to participate with the ET system, it needs to download the software to set up ET accounts and ET cash accounts. In other words, it needs to be able to buy and sell ET's and so needs to set up the accounts to do this. The ET accounts are owned by the users, just like their checking, saving, investment accounts, and are held by the banks, and accessible on-line by the users. The ET cash accounts are owned by the banks but held in the user's name, and accessible on-line as read-only by the user. The ETs are created electronically by the bank, which basically converts cash to the ET equivalent value, which is what happens when ET's are bought. When sold, the ET's are then converted back to cash. This is shown in FIGS. 6 and 7 (see e.g., transactions 610, 608, 614, 618, 624, 632, 636, 732, 712, 718, and 716. It's a zero-sum game for any of the authorized financial institutions also seen in FIGS. 6 and 7, as any cash transferred by any user buying ETs can be eventually withdrawn by any variety of individuals. Each of the ETs are transferrable down any block chain. To provide this service authorized financial institutions will need to charge fees somewhere, such as a conversion fee so that the resultant ET value is slightly less than the cash to buy it or could provide this service for "free" if the interest earned by the cash account went to the bank. However implemented, these accounts set up by the bank provide for the first block in the E-Transaction chain. The user could command his etapp 804 to buy $1000 worth of ETs for him, and his etapp 804 would log-on to his bank accounts and do the purchase, which would move $1000 from his checking account to the bank's ET cash account for the user and create an ET account for the user worth $1000. As the user makes E-Transactions and transfers his ETs to others, he would see both his ET account and the banks ET cash account diminish to zero as the user transfers all his ETs and they are all eventually redeemed for cash at any authorized entity including ATM's.

When any user transfers ET's to anyone a secure transaction is established by the following. The user tells his etapp 804 that they want to send a $500 ET to Employee "A", who is expecting a payment for work done, the user's etapp 804 sends a secure message to Employee "A's", etapp 804 using their public key, which then decodes with its private key, and sends an encoded affirmative back to the user's etapp 804 using the user's public key. The user's etapp 804 then decodes the message using its private key and then sends an encoded transaction request to the ET system for transferring the ET from the user's ET account to Employee "A's" ET account. The ET system creates this transfer block with the transfer details, which are associated in the ET system data base with a newly created RNIDt which is one of the identifiers for this new transfer block. A fee could be charged for this service. The other identifier is the RNIDo for the user's previous ownership block. On the creation of the new RNIDt a sequential transaction number is assigned and associated with the new RNIDt. The sequential number prevents insertion of fraudulent blocks into the block chain as they would not have proper sequence numbers. Then the ET system creates two new ownership blocks with newly created RNIDos with the new block ET values associated with these RNIDos in the ET system database. They would also be identified with the new RNIDt. In this way new blocks are securely created.

Part of the banking ET system software has the capability for any person to redeem their ETs for cash. A person would simply request their etapp 804 to redeem a certain ET value to the cash equivalent and deposit the funds into any of their financial accounts. The etapp 804 enters the ET system with the person's last ownership block ID number, the RNIDo (last) to start the back propagation of the block chain as described above to retrieve the first ownership RNIDo(first) associated with the starting block of that chain as well as the financial transaction details required by another bank to transfer cash from that account. Then the etapp 804 logs on to the person's bank account and submits a request for the bank to transfer funds from the holding bank of the cash account along with the cash account number and other relevant fund transfer information associated with that RNIDo(first) into the person's checking, savings, or investment account. This transaction is security enabled by multiple layers. The first is that the person first has to enroll their etapp 804 as a trusted source for the account. This can be done exactly the same way the etapp 804 enrolled as a trusted source for the ET system as explained about. The first security layer is by the authentication by the etapp 804 of the person. The second is the authentication by the bank of the etapp 804. And the third is by the use of the private/public cryptographic system to secure the transactions.

The person's bank sends the encrypted request to the cash account holding bank through the ET system along with account number. When the holding bank authenticates the account number, it sends an encrypted affirmation back to the requesting bank, the ET system creates a new transaction block with identifiers being a new transaction RNIDt associated with a sequential transaction number and all the data required to execute the transaction, and the requesting person's last RNIDo(last). Once the transaction is executed new ownership blocks are created by the ET system documenting the new ET ownership positions, each identified by the new created RNIDt and new RNIDo's for both parties, the requesting party and the one who sourced the ET being redeemed.

Figure 9:
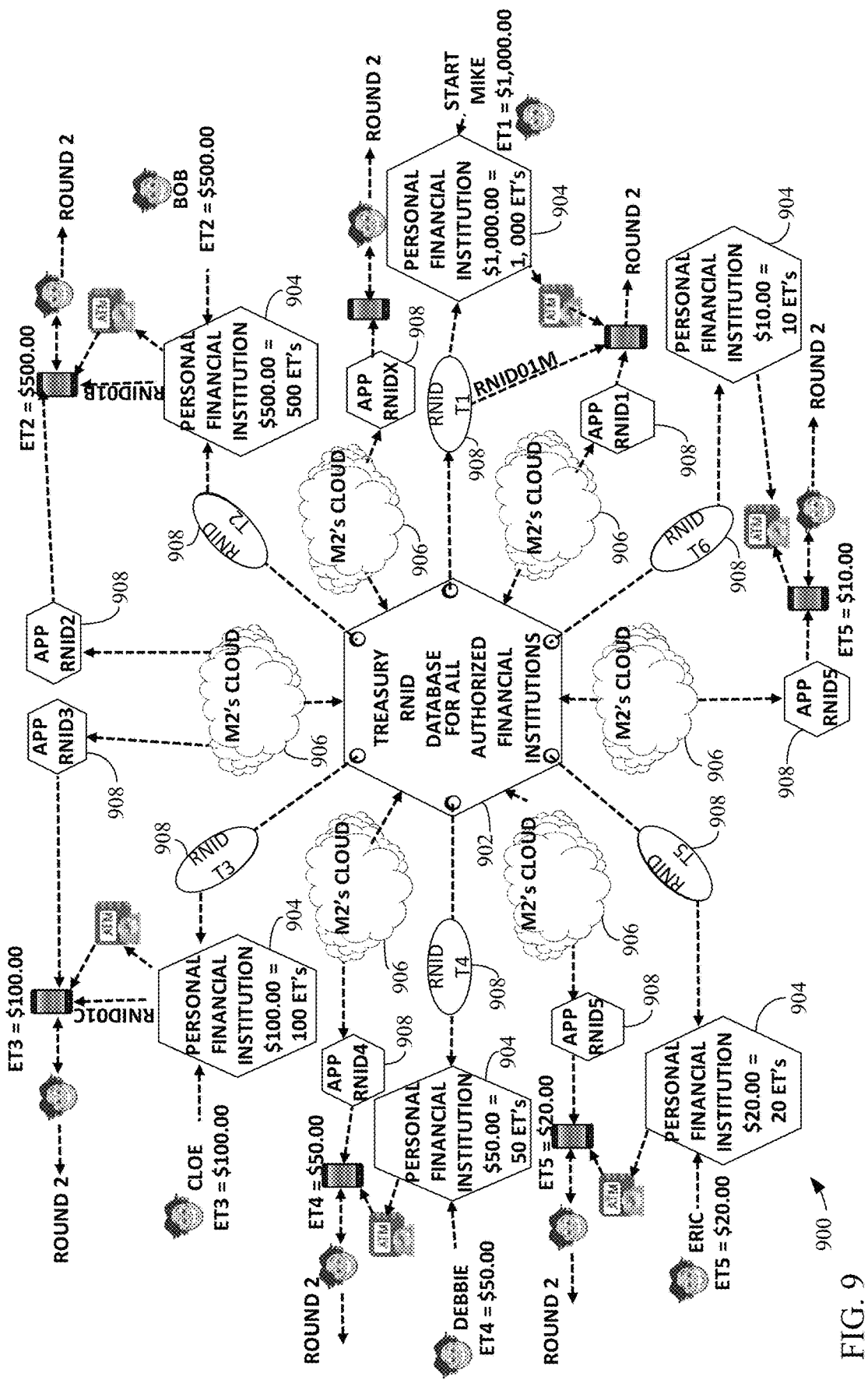
FIG. 9 depicts a Treasury RNID database that supports all authorized financial institutions.
Figure 10:
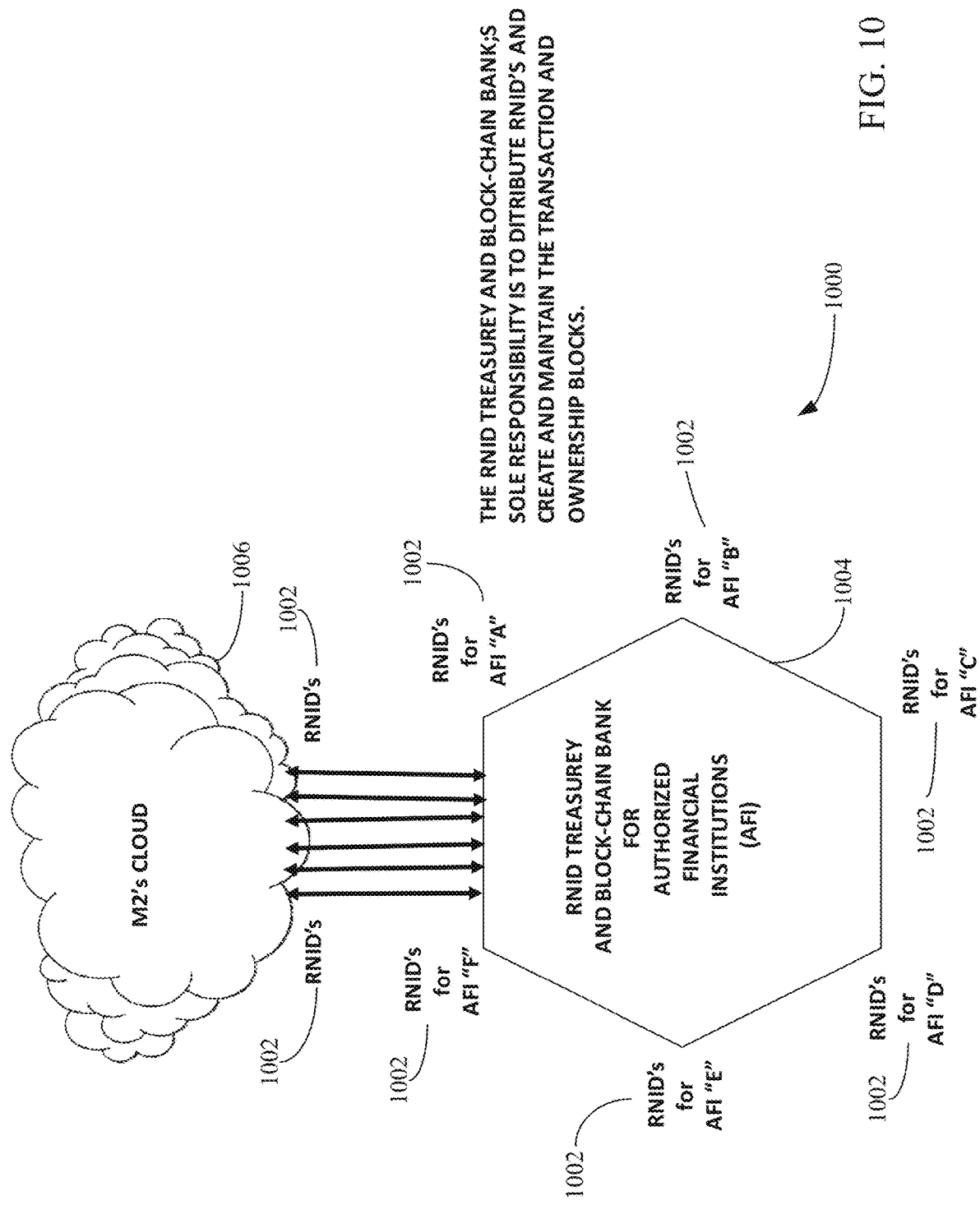
FIG. 10 depicts a diagram illustrating the distribution of random number identifications in accordance with an example embodiment.

One implementation or approach of an ET system would be an exclusive secure RNID database ecosystem totally under the direction of a separate independent company for all authorized financial institutions and enabling them in the creation of all transfer and ownership blocks, as well as the provision of all RNIDS and time stamps. For the sake of reference, this independent institution will be referred to as the Electronic Token Transfer Treasury, or the ETTT. FIG. 9 depicts a Treasury RNID database 902 that supports all authorized financial institutions 904, which may be communicatively coupled to database 902 via a cloud computing environment 906. This ETTT would operate and maintain all block chains for the ET system, but would not be involved in any of the cash transfers i.e. for the buying and selling of the ETs, which would be under the exclusive purview of the authorized financial institutions, as shown in FIG. 9. The company would solely buy blocks of RNIDs 908 from a provider's RNID ecosystem for instant allocation when called to create or initiate any new blocks for the chain. They also would earn their money by adding additional fees that they may require. FIG. 10 depicts a diagram illustrating the distribution of random number identifications (RNIDs 1002) in accordance with an example embodiment. As shown in FIG. 10, treasury and block-chain bank 1004 may distribute RNIDs 1002 via a cloud computing environment 1006.

Another approach for the bank or financial institution interface like above and the creation of this ETTT for the sole purpose of handling or interfacing all authorized financial institutions ET transactions instead of the individual local banks doing it. The individual authorized financial institutions would interface with the ETTT to handle their own customers buying and selling of ETs. The ETTT would be an independent creation and form the banking relationships of any of the individual financial institutions, or it could be the creation of newly developed companies wishing to participate in the ET world. Now, instead of individual ET cash accounts set up for each customer at their bank for the purchase of ETs, there will be only one ET cash account held by the ETTT.

Functionally how the ETTT and authorized financial institutions would work is that a customer would go to their local branch bank and set up a new account for ETs. Then, when they log on to their bank account, they will see this new account, along with their checking, saving, and other accounts. To buy ET's all they need to do is to transfer cash, say from the checking account, into the ET account, where the cash is now converted to ETs. Operationally, this simple operation by the user is accomplished by the customer's bank electronically transferring the cash from the customer's cash account into the ETTT cash account.

Likewise, when a customer redeems ETs for cash, it is the simple operation of moving the cash amount from their ET account into, say, their checking account. Operationally this accomplishes by the customer's bank electronically transferring the cash from the ETTT cash account into the customer's bank account.

These operations rely on the book keeping integrity of all the participating banking institutions, including the ETTT. Since the ETTT is the owner of the ET cash account, it stands to lose if there is an integrity breach, so it needs to own and maintain the ET transaction ledgers and will operate the ET block chain transaction system described above, including the etapps 804 (as shown in FIG. 8). If the integrity of the entire transaction block chain is assured, then there is no need to back propagate the chain when ETs are redeemed, particularly now that there are no individual ET cash accounts to verify. However, the block chain record needs to be available to do forensic analysis in case of integrity breaches, so that the point of breach can be found and acted upon.

The block chain operates as originally described for the individual banks (e.g., 908, as shown in FIG. 9) except for the starting and ET redemption blocks. The starting block could be as described above, or by the use of the customer's etapp 804, where the etapp 804 is instructed by the customer to set up an ET account and buy $1000 worth of ETs for deposit into it, taking the funds from the checking account. The etapp 804 would log on to the customer's bank using the bank's public key to make this encrypted request. The bank validates the etapp 804 as an authorized user and logs onto the ETTT system, using the ETT's public key for the handshake to transfer the $1000 to the ETTT cash account. Once accomplished, the bank changes the customer's ET account to reflect the addition of 1000ET. Simultaneously, the ETTT system has created a transaction block describing the details of the transaction with a sequential transaction number, all associated with a newly created RNIDt which, as before, is one of the identifiers for the new transaction block. The other identifier, as before, is a newly created RNIDo which is associated with the owner's new ET value. This RNIDo is sent back to the bank, which retains a copy as one of the identifiers of the owner's ET account, and sends it on to the owner's etapp 804 along with the current ET account value.

Figure 11A:
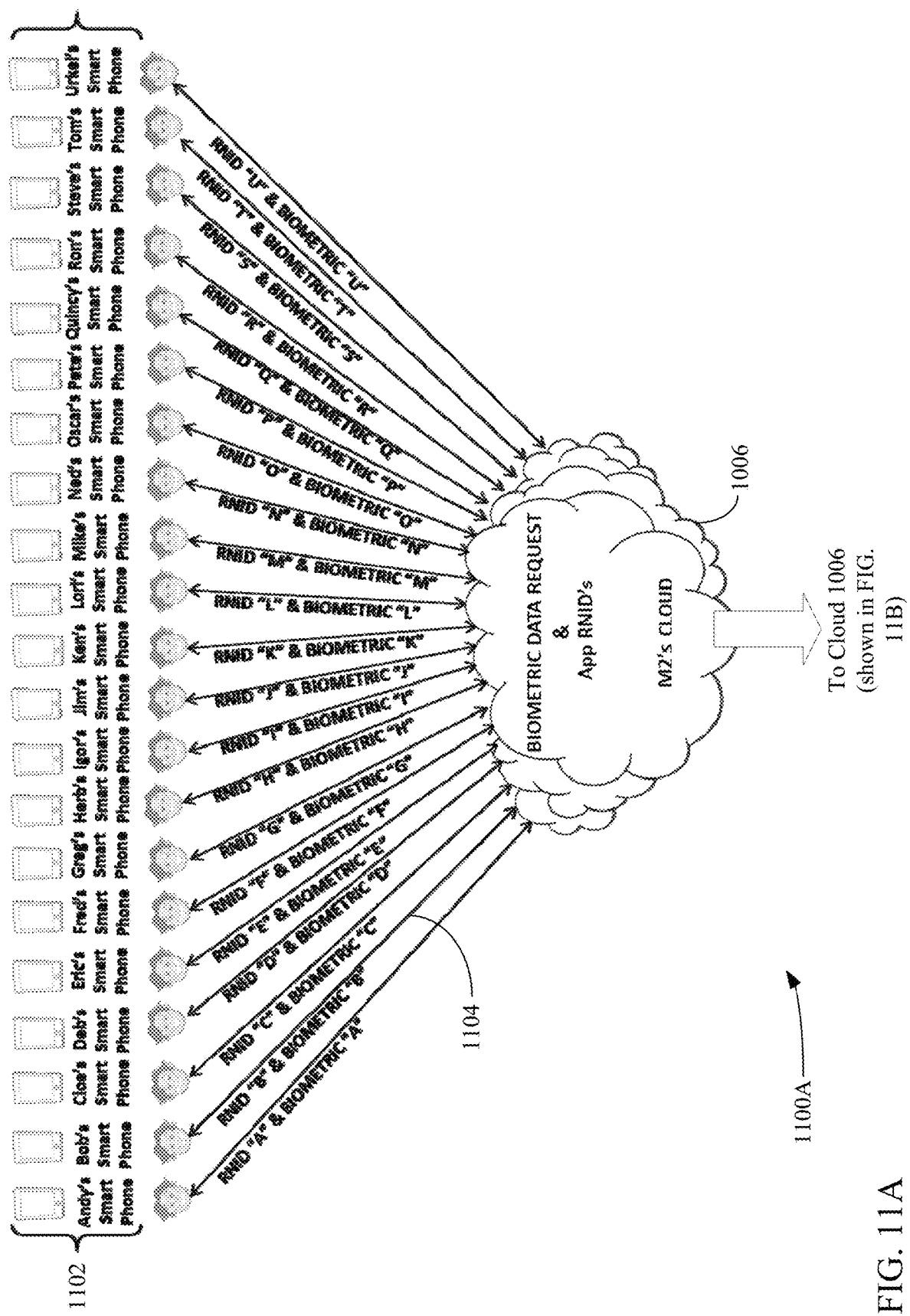
FIGS. 11A-11C depict a diagram illustrating for transferring electronic tokens between users and financial institutions in accordance with an example embodiment.
Figure 11B:
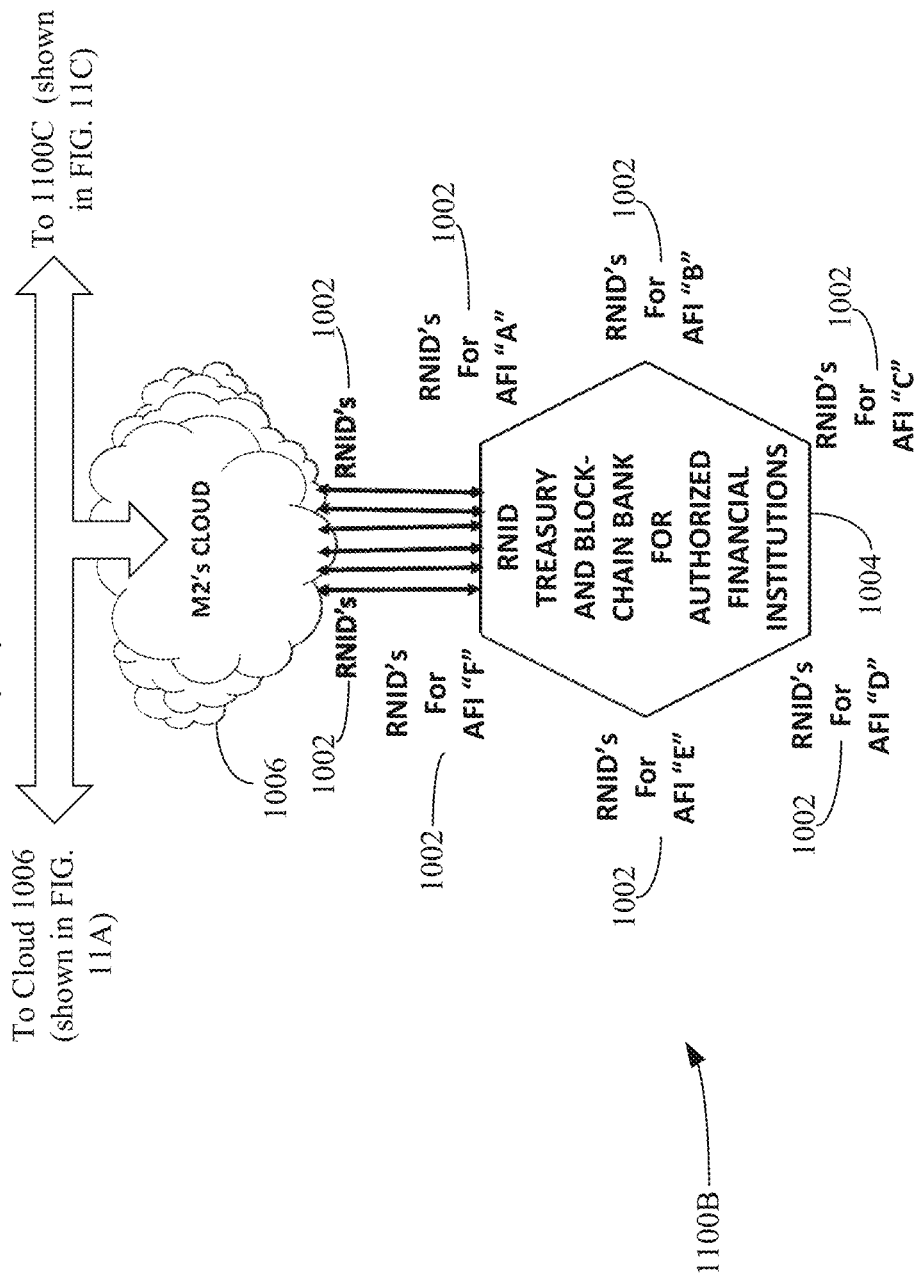
Figure 11C:
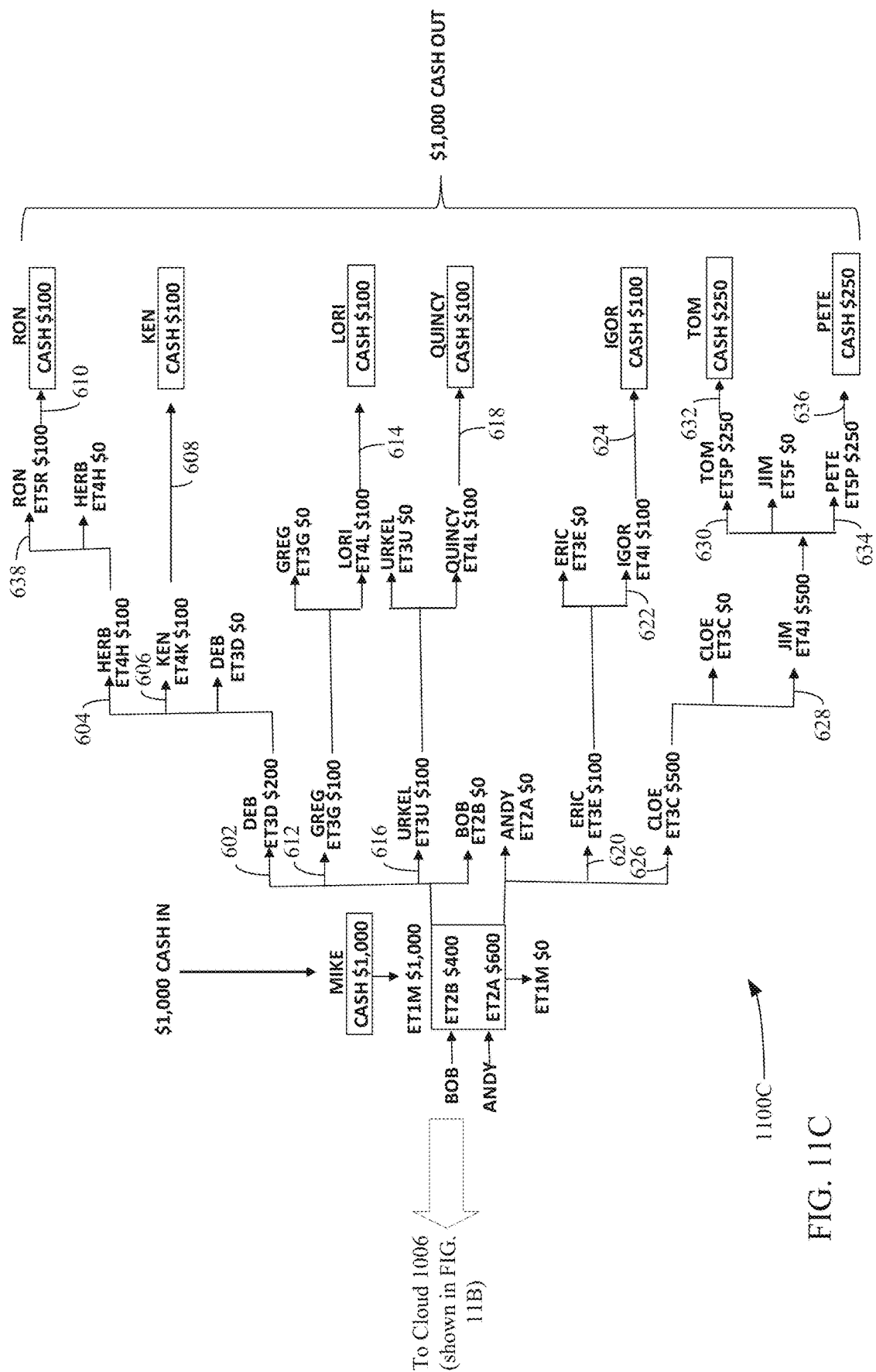

Now let's look at the case of transferring ET from one person to another, such as Individual "A" wants to transfer 200ET to Individual "B", which is described with reference to FIGS. 11A-11C. FIGS. 11A-11C depict diagrams 1100A-1100C illustrating the transferring of electronic tokens between users and financial institutions in accordance with an example embodiment. This transfer is accomplished via the etapps 804. Individual "A" commands his etapp 804 (e.g., via a voice command) that he wants to transfer 200ET to Individual "B" 1102. If Individual "B" 1102 is in Individual "A's" contact list, his etapp 804 contact's Individual "B'"s etapp, and requests Individual "B's" 1102 public key. If Individual "B" is not in the contact list, Individual "A" may provide his etapp 804 of a contact number or email address. On receipt of Individual "B's" public key, Individual "A's" etapp 804 sends Individual "B's" etapp the encrypted request 1104 and the amount. If Individual "B" 1102 affirms, he uses Individual "A's" 'public key to send his RNIDoB stored in his etapp from the last transaction. Then Individual "A's" etapp 804 contacts Individual "A's" bank with the transfer amount, Individual "B" RNIDoB, and Individual "A's" RNIDoA from his last transaction. If this RNIDoA matches the one on his ET account and his account has enough ET to cover the 200ET transfer, the bank contacts the ETTT with the request, and the ETTT uses the RNIDoB and RNIDoA to locate the previous ownership blocks in the chain, and uses the ET amount values from those to create a new transaction block with a new RNIDt associated with the transaction details and transaction number associated with it, along with the identifiers of RNIDoA and RNIDoB. It then creates new ownership blocks for Individual "A" and Individual "B" 1102 with new RNIDoA and RNIDoB associated with new ET ownership, along with the RNIDt reference number. The ETTT sends both the RNIDoA and RNIDoB back to Individual "A'"s bank, which on confirming the new ET amount in Individual "A's" account replaces his previous RNIDoA with a new one and sends the RNIDoA on to Individual "A's" etapp 804 with new ET value. It also sends RNIDoB back to Individual "A's" etapp 804, which forwards the encrypted number to Individual "B's" etapp. Individual "'B's" etapp contacts his bank and sends both the previous and new RNIDoB. If the previous RNIDoB matches the one on Individual "B's" 1102 accounts, the new amount is entered and the previous RNIDoB is replaced with the new one. This completes the transaction.

In this way a complete block chain transaction record is created and kept by the ETTT, with real time updates to both the user's bank account and etapp 804 as transactions occur, allowing in affect the transfer of funds between etapps 804.

The integrity of this record simplifies the redemption of ET and eliminates the need for back propagation through the block chain. The user simply instructs their etapp 804 to redeem a certain amount of ET. The etapp 804 contacts the user's bank 904 with the request amount and the current RNIDo. If the RNIDo matches the one on the user's ET account and there is enough ET in the account for the redemption, the bank sends the request on to the ETTT, which uses the RNIDo to locate the last ownership block for the user, creates a new transaction block with a new RNIDt along with the RNIDo identifier, where the details of the transfer of the ET cash value from the ETTT cash account to the user's bank are associated with the RNIDt. A new ownership block is then created for the user with a new RNIDo and the new ET amount and the RNIDt reference. The funds are sent to the bank for deposit into the users checking, or other cash account, along with the new RNIDo and associated ET value. If the new ET value is confirmed by the bank, the new value is entered into the users ET account along with new RNIDo, and both are sent to the user's etapp 804 for update with the new information. FIG. 11A-11C depict the complete process.

Once in the block chain, transactions can be made outside the financial institutions, such as cash for ET's or ET's for cash, which lets the ET value "float".

This approach is also applicable to transactions for other than cash equivalent ETs. For example, it could be used for a nested Random Number-Based Security Ecosystem for tracking items through the retail chain from point of manufacture, through transportation, into distribution centers, and on to the store shelves. An example of how this would work follows for prescription medicines.

At time of manufacture, a RNID NFC tag is attached to an individual item (i), be it a vial, bottle, box, plastic waffle pack, etc. This item is the unit that will be tracked through the distribution chain until dispensed to a customer. At the time of tag attachment an "enrollment" transaction block will be created with a transaction RNIDt1 and RNIDt creation time, t1, very much as with the above description. The item RNID, referred to as the RNIDi, will be married to the RNIDt1, time and item product data in the SDB. Then an ownership block will be created, with two ID numbers, the RNIDt1 that created the block, and a new RNIDo1 number. These will be married to the RNIDi in the SDB.

Figure 12:
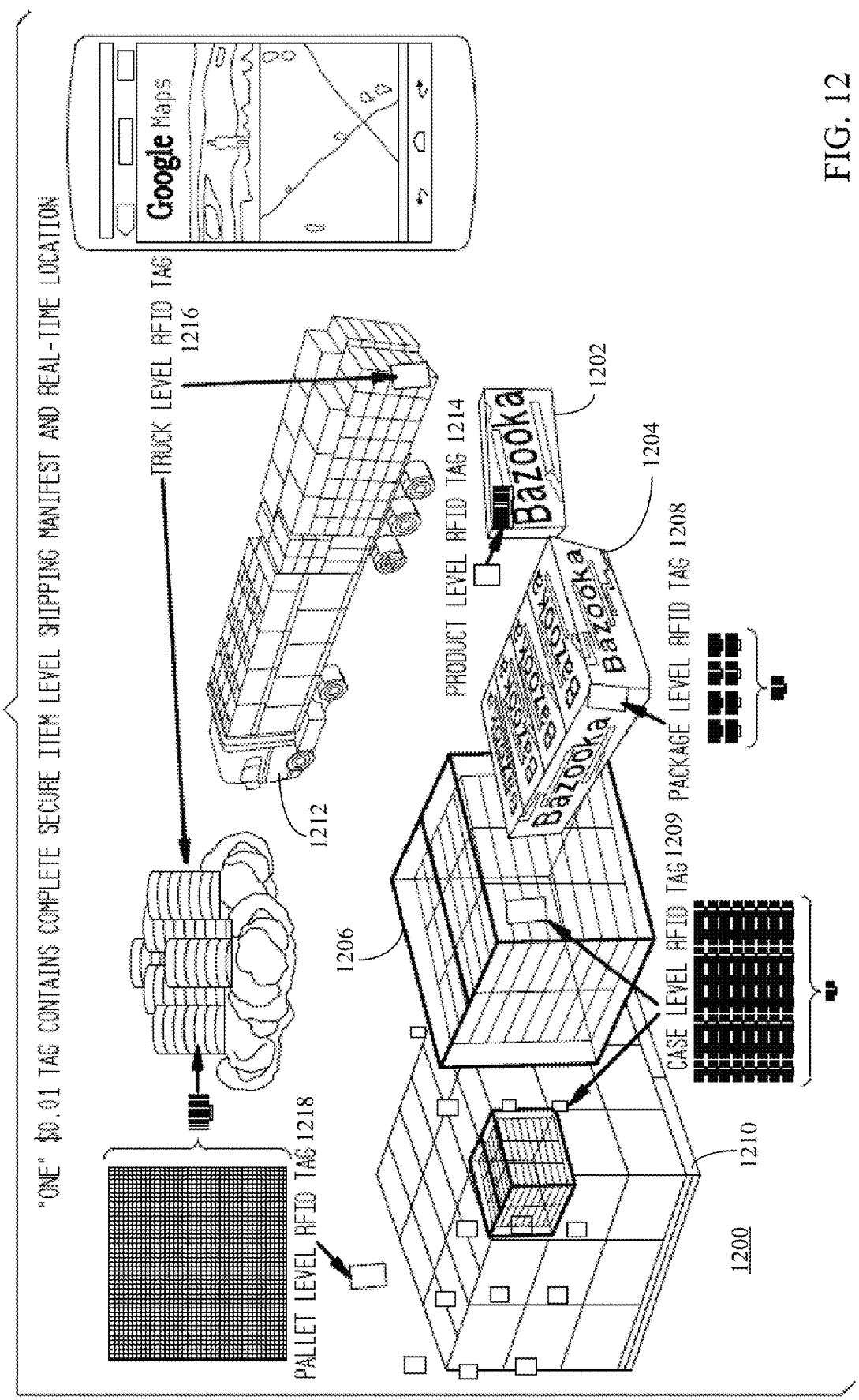
FIG. 12 depicts a diagram illustrating nested random number identifications in accordance with an example embodiment.

FIG. 12 depicts a diagram illustrating nested random number identifications in accordance with an example embodiment. When items 1202 are aggregated for shipping, into a $2^{nd}$ larger box 1204, a "nesting" algorithm will be employed. The 2nd larger container 1204 will have a RNID NFC tag 1208 attached to it with own random number referred to as RNIDb. As the items 1202 are put into this second larger box 1204, the item tags 1214 are read into an "aggregation" group, and once all the items 1202 are in the second container 1204 the SDB marries this group of RNIDi's with the RNIDb, so that when the RNIDb is read, the item tag RNIDi's are also visible for accounting purposes.

At the completion of this first nesting process, a new transaction block is created, with a new RNIDt, RNDt2, and the associated creation time, t2. This new transaction block will reference all the status blocks of the nested tags that have been grouped under RNIDb described above. It will be identified with the ID numbers of RNDt2 and RNIDo1. Then a new ownership block will be created with ID numbers RNIDt2 and RNIDo2.

Now let's say the boxes are put into larger containers for shipping. Again, the nesting algorithm will be employed. A RNID NFC tag 1209 will be attached to the container 1206 with ID number RNIDc. The box RNIDbs will be read as they are put into the container 1206. Once loaded, this group of RNIDbs will be grouped under the RNIDc in the SDB.

A new transaction block with RNIDt3 and t3 will be created, referencing all the RNIDos of the boxes in the container and the RNIDc they are grouped under. It will be identified with the IDs RNIDt3 and RNIDo2. A new ownership block will be created with ID numbers RNIDt3 and RNIDo3.

Now let's say the containers 1206 are put into even a 4th larger container for shipping i.e. pallet 1210. Again, the nesting algorithm will be employed. A RNID NFC tag 1218 will be attached to the Pallet 1210 with ID number RNIDp. The container RNIDcs will be read as they are put onto the pallet 1210. Once loaded, this group of RNIDcs will be grouped under the RNIDp in the SDB. A new transaction block will be created as above with IDs RNIDt4 and RNIDo3, and a new ownership block will be created with IDs RNIDt4 and RNIDo4.

The Pallets 1210 will now be loaded into a vehicle 1212 for transport to a distribution center. The vehicle 1212 will have a RNID NFC tag 1216 with ID number RNIDv, under which all the RNIDp will be grouped, as above. A new transaction block (i.e. Manifest) will be created as above with IDs RNIDt5 and RNIDo4, and a new ownership block will be created with IDs RNIDt5 and RNIDo5.

Figure 13:
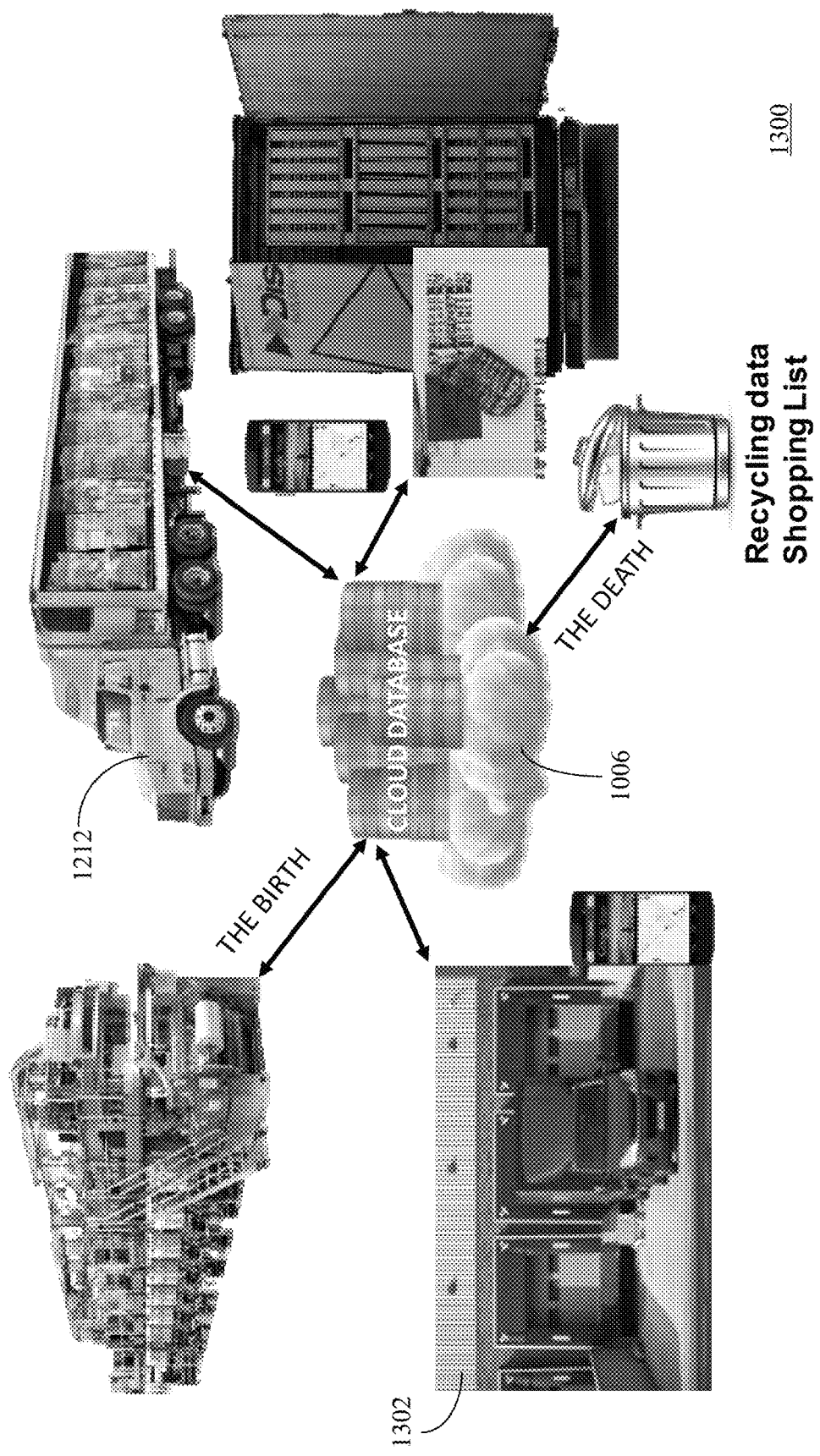
FIG. 13 depicts a diagram illustrating the life cycle of product security in accordance with an example embodiment.

When the vehicle 1212 arrives at the distribution center 1302 (as shown in FIG. 13) it is unloaded and the pallets 1210 are placed on shelves, which are identified by RNID NFC tags with ID numbers referred to as RNIDs. The distribution center 1302 has a random number associated with it in the SDB, referred to as RNIDd. When the pallets 1210 are unloaded, their tags 1218 are read, and are subtracted from the group under RNIDv in the SDB and are moved under RNIDd. As the pallets 1210 are place on shelves, their tags 1218 are read, as well as the shelf tag, and those RNIDps are grouped in the SD under the RNIDs of the shelf and are subtracted from the group under RNIDd.

A transaction block is created for the removal of pallets 1210 from the vehicle 1212, referencing the previous ownership block, with ID numbers RNIDt6 and RNIDo5, showing the transfer of pallets 1210 of the truck 1212 into the new ownership of the distribution center 1302, which a new ownership block with ID numbers RNIDt6 and RNIDo6.

As the pallets 1210 are loaded onto the shelves, a transaction block is created for each shelf, with ID numbers RNIDt7 and RNIDo6, and shows the removal of pallets 1210 from RNIDo6 for a new ownership block of RNIDt7, RNIDo7, which shows which pallets 1210 are associated with what shelves.

As pallets 1210 are removed from the shelves to be placed into a vehicle 1212 for delivery to a retail store, their tags are read, as well as the shelf tag, and their RNIDp's are subtracted in the SDB from the group under RNIDs and placed in the group under that particular vehicle RNIDv.

A transaction block is created for this transfer with ID numbers RNIDt8 and RNIDo7, a new ownership block with ID numbers RNIDt8 and RNIDo8, where RNIDo8 reflects the new ownership by the vehicle 1212 of the pallets 1210. As a new pallet 1210 is generated or built for shipment to retail businesses a new RNID is created (RNIDr).

When the vehicle 1212 drops off pallets 1210 at a retail business, which has an RNID for that store in the SDB, referred to as RNIDr, their tags are read and subtracted from the group under RNIDv in the SDB, added to the group under RNIDr. A transaction block is created for this with the ID numbers RNIDt9 and RNIDo8 and a new ownership block with RNIDt9 and RNIDo9, with RNIDo9 reflecting the new ownership by the store, and each time the vehicle door is opened the driver will read the vehicle tag and the Smart Phone Application will time stamp and GPS stamp its location. If the tag is destroyed prior to authorized stop the tag will not function and a compromise will be noted into the GPS stamp, for example.

Next, the store will remove the boxes 1206 from the pallets 1210, and the boxes 1204 will be removed from boxes 1206, and the items 1202 removed from the boxes 1204, to be placed on shelves.

As the container 1206 are removed from the pallets 1210, their tags will be read with the pallet tag 1218 to remove their RNIDc's from the groups under RNIDp until all the RNIDp are empty sets. The transaction blocks will reflect these transfers in the SDB and are identified by RNIDt10 and RNIDo9 with new ownership blocks with RNIDt10 and RNIDo10, where RNIDo10 will reflect continuing ownership by the store.

As the boxes 1204 are removed from the containers 1206, their tags 1208 will be read with the container tag 1209 to remove their RNIDbs from the groups under RNIDc until all the RNIDc are empty sets. The transaction blocks will reflect these transfers in the SDB and are identified by RNIDt11 and RNIDo10 with new ownership blocks with RNIDt11 and RNIDo11, where RNIDo11 will reflect continuing ownership by the store.

As the items 1202 are removed from the boxes 1204, their tags 1214 will be read with the box tag 1208 to remove their RNIDi's from the groups under RNIDb until all the RNIDb are empty sets. The transaction blocks will reflect these transfers in the SDB and are identified by RNIDt12 and RNIDo11 with new ownership blocks with RNIDt12 and RNIDo12, where RNIDo12 will reflect continuing ownership by the store.

When an item 1202 is bought by a customer with app ID RNIDa, the SDB will subtract the RNIDi from the group under RNIDb's and transfer it into the personal database of the RNIDa. A transaction block will be created showing this transfer with ID numbers RNIDt13 and RNID12, a new ownership block with ID numbers RNIDt13 and RNIDo13, where RNIDo13 reflects new ownership by RNIDa.

A secure block chain is thus created for every item from manufacture to point of sale and can be followed backwards for its history in the supply chain, as shown in FIGS. 12 and 13.

It is noted that embodiments may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Additional Example Embodiments

An Electronic Token (ET) system is described herein. The system comprising: a block chain that securely documents a financial transaction between a plurality of users and between the plurality of users and a plurality of authorized financial institutions, the block chain configured for the creation of ETs, by at least one of the plurality of authorized financial institutions, in exchange for funds or an equivalent monetary value of the ETs, wherein a user of the plurality of users purchases the ETs from at least one authorized financial institution of the plurality of authorized financial institutions, wherein a financial transfer of the ETs from a first user of the plurality of users that initially purchases the ETs to a second user of the plurality of users, and the redemption of ETs by the second user through the second user's authorized financial institution communicating with another authorized financial institution of the plurality of authorized financial institutions that holds the original funds to transfer the funds to a bank account of the second user requesting the financial transfer, and wherein all transactions and their ownership provide a traceable ET chain that is secure and irreversible, by using a write-protected memory, the write-protected memory comprising at least one of: a write-once, read many (WORM) memory; or a read-only memory (ROM) various.

In accordance with the system, the block chain utilizes a transaction block and an ownership block, wherein the ownership block is identified by two random number identifications (RNIDs), the first of the two RNIDs being a newly-generated ownership RNID (RNIDo) that an ET software app executing on a computing device retains for subsequent transactions, the RNIDo being associated with the ET value of the ownership block in a secure RNID database, and the second of the two RNIDs being an RNID of the transaction block (RNIDt), the transaction block generating the ownership block.

In accordance with the system, redemption of an ET is performed by traversing the block chain backward to the source monetary transaction to verify the authenticity of the redemption which then authorizes the issuance of funds for the ET.

In accordance with the system, creation of the transaction block and the ownership block are performed securely, to prevent unauthorized access to and use of the ET system, via a public/private key encryption security protocol to exchange data files, wherein a user of the plurality of users or an authorized financial institution of the plurality of authorized financial institutions who desires to use the ET system, logs onto a public ET web site with the computing device and downloads the ET software application, wherein the ET software application is configured to prompt the user to enter a device PIN (Personal Identification Number) and collects biometric data, wherein the biometric data is used for future authentication of an authorized user of the computing device, which prevents unauthorized users from accessing the ET software application executing on the computing device, thereby resulting in a two-step authentication for log-on to the block chain, and wherein the ET software application is configured to first recognize the user as an authorized user, and, subsequently, the ET system log-on recognizes the at least one of the computing device or the ET software application password as legitimate, after which the user is ready to use the ET system.

In accordance with the system, the ET software application is a "smart" software application configured to receive and analyze voice input.

In accordance with the system, an authorized financial institution of the plurality of authorized financial institutions, participate with the ET system by downloading banking ET system software to set up ET accounts, and ET cash accounts, to enable the buying and selling ETs, wherein at least one of: the ET accounts are owned by the plurality of users, and are held by their respective authorized financial institutions of the plurality of authorized financial institutions, and are accessible on-line by the plurality of users; or the ET cash accounts are owned by the plurality of authorized financial institutions but held in the respective names of the plurality of users, and accessible on-line as read-only by the plurality of users, wherein the ETs are created electronically by the authorized financial institution, which converts funds to the equivalent ET value when ETs are purchased and converts ETs to equivalent funds when ETs are sold.

In accordance with the system, the banking ET system software has the capability for any user of the plurality of users to redeem their respective ETs for funds at any authorized financial institution of the plurality of authorized financial institutions, wherein a user of the plurality of users requests their ET software application to redeem a certain ET value to the monetary equivalent and deposit the funds into any of their financial accounts.

In accordance with the system, the ET system comprises an exclusive secure RNID database ecosystem maintained by a separate independent institution for all authorized financial institutions, and enabling the authorized financial institutions in the creation of all transfer and ownership blocks, as well as the provision of all RNIDs and time stamps, wherein the independent institution comprises an Electronic Token Transfer Treasury (ETTT).

In accordance with the system, the ETTT handles all authorized financial institutions' ET transactions instead of each authorized financial institution of the plurality of authorized financial institutions, wherein a complete block chain transaction record is created and kept by the ETTT, with real time updates to both a bank account of a user of the plurality of users and the user's ET software applications as transactions occur, allowing in effect the transfer of funds between ET software applications.

In accordance with the system, once in the block chain, funds for ETs or ETs for funds transactions are conducted outside the authorized financial institutions, which enables the ET value "float".

In accordance with the system, the system is configured for a nested Random Number-Based Security Ecosystem for tracking items through a retail chain from point of manufacture, through transportation, into distribution centers, and on to retail store shelves.

In accordance with the system, the nested Random Number-Based Security Ecosystem items are aggregated for shipping into nested boxes stacked onto a pallet and put into a vehicle, at which time a "nesting" algorithm is employed.

A method implemented by a block chain is further described herein. The method includes: securely documenting a financial transaction between a plurality of users and between the plurality of users and a plurality of authorized financial institutions; and creating an electronic token (ET) by at by at least one of the plurality of authorized financial institutions, in exchange for funds or an equivalent monetary value of the ETs, wherein a user of the plurality of users purchases the ETs from at least one authorized financial institution of the plurality of authorized financial institutions, wherein a financial transfer of the ETs from a first user of the plurality of users that initially purchases the ETs to a second user of the plurality of users, and the redemption of ETs by the second user through the second user's authorized financial institution communicating with another authorized financial institution of the plurality of authorized financial institutions that holds the original funds to transfer the funds to a bank account of the second user requesting the financial transfer, and wherein all transactions and their ownership provide a traceable ET chain that is secure and irreversible, by using a write-protected memory, the write-protected memory comprising at least one of: a write-once, read many (WORM) memory; or a read-only memory (ROM).

Example Computer System Implementation

Figure 14:
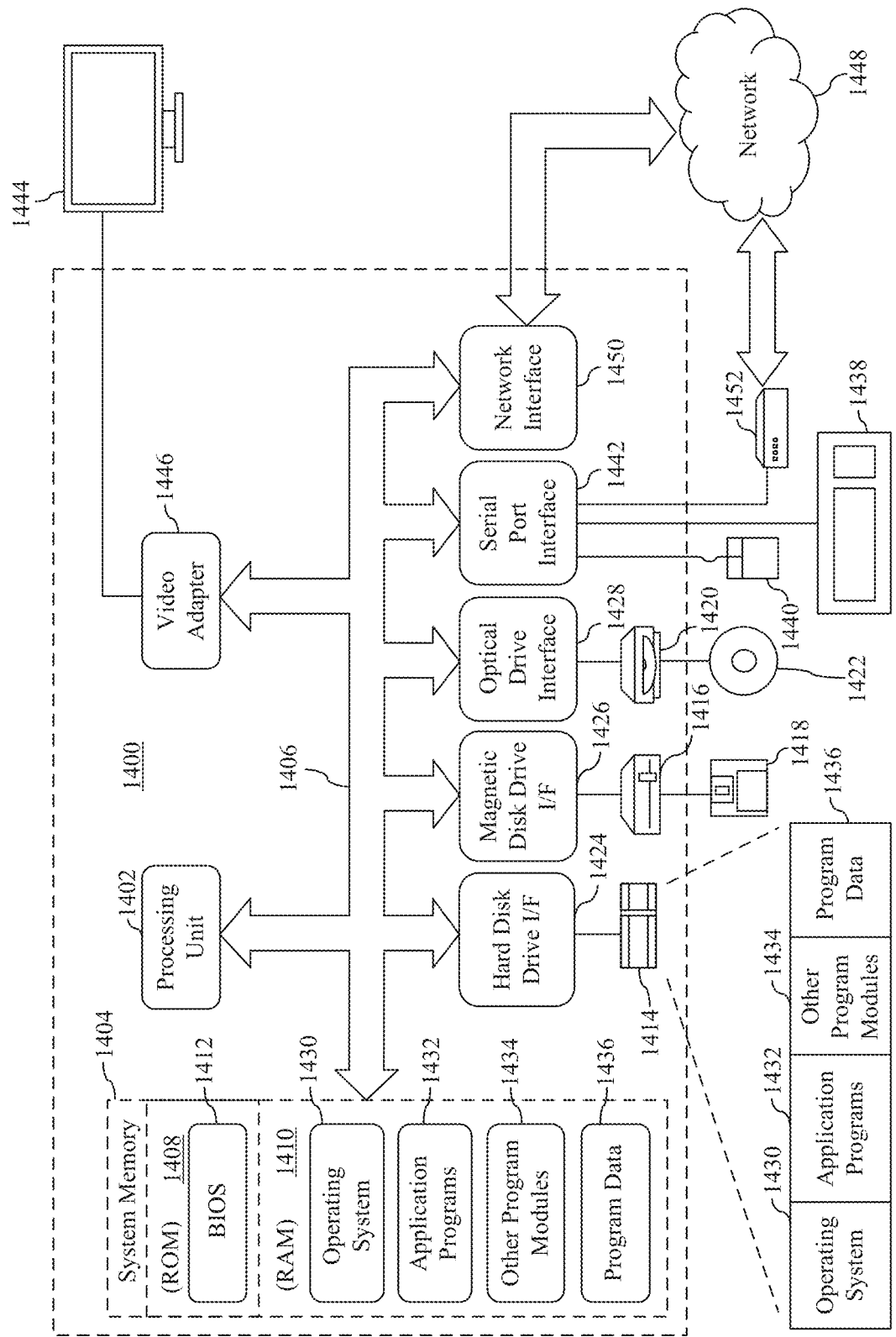
FIG. 14 is a block diagram of a computing device/system in which the techniques disclosed herein may be performed and the example embodiments herein may be utilized.

FIG. 14 depicts an exemplary implementation of a computing device 1400 in which embodiments may be implemented. For example, computing device 1400 may be used to implement the embodiments described above with reference to FIGS. 1-13, as described above. The description of system 1400 provided herein is provided for purposes of illustration and is not intended to be limiting. Embodiments may be implemented in further types of computer systems, as would be known to persons skilled in the relevant art(s).

As shown in FIG. 14, computing device 1400 includes one or more processors, referred to as processor circuit (or unit) 1402, a system memory 1404, and a bus 1406 that couples various system components including system memory 1404 to processor circuit 1402. Processor circuit 1402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1402 may execute program code stored in a computer readable medium, such as program code of operating system 1430, application programs 1432, other programs 1434, etc. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random-access memory (RAM) 1410. A basic input/output system 1412 (BIOS) is stored in ROM 1408.

Computing device 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1106 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g. solid-state drives (SSDs)), digital video disks, RAMs, ROMs, and other hardware storage media.

A number of program modules or components may be stored on the hard disk, magnetic disk, optical disk, ROM, or RAM. These program modules include an operating system 1430, one or more application programs 1432, other program modules 1434, and program data 1436. In accordance with various embodiments, the program modules may include computer program logic that is executable by processing unit 1402 to perform any or all the functions and features of the embodiments described herein.

A user may enter commands and information into the computing device 1400 through input devices such as keyboard 1438 and pointing device 1440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1402 through a serial port interface 1442 that is coupled to bus 1406, but may be connected by other interfaces, such as a parallel port, game port, or a universal serial bus (USB).

A display screen 1444 is also connected to bus 1106 via an interface, such as a video adapter 1446. Display screen 1444 may be external to or incorporated in computing device 1400. Display screen 1444 may display information, as well as being a user interface for receiving user commands and/or other information (e.g., by touch, finger gestures, virtual keyboard, etc.). In addition to display screen 1444, computing device 1400 may include other peripheral output devices (not shown) such as speakers and printers.

Computing device 1400 is connected to a network 1448 (e.g., the Internet) through an adaptor or network interface 1450, a modem 1452, or other means for establishing communications over the network. Modem 1452, which may be internal or external, may be connected to bus 1106 via serial port interface 1442, as shown in FIG. 14, or may be connected to bus 1406 using another interface type, including a parallel interface.

As used herein, the terms "computer program medium," "computer-readable medium," and "computer-readable storage medium" are used to refer to physical hardware media such as the hard disk associated with hard disk drive 1414, removable magnetic disk 1418, removable optical disk 1422, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1432 and other programs 1434) may be stored on the hard disk, magnetic disk, optical disk, ROM, RAM, or other hardware storage medium. Such computer programs may also be received via network interface 1450, serial port interface 1442, or any other interface type. Such computer programs, when executed or loaded by an application, enable computing device 1400 to implement features of embodiments described herein. Accordingly, such computer programs represent controllers of the computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 502 to perform any or all of the functions and features of the embodiments described with reference to FIGS. 1-13, as described above.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments but should be defined only in accordance with the following claims and their equivalents.

What is claimed is:

1. An Electronic Token (ET) system comprising a transaction block chain that securely documents a financial transaction between a plurality of users and between the plurality of users and a plurality of authorized financial institutions, the transaction block chain configured for the creation of ETs, by at least one of the plurality of authorized financial institutions, in exchange for funds or an equivalent monetary value of the ETs, the system comprising:
    a processing system comprising at least one processor circuit; and
    at least one memory that stores program instructions, that, when executed, configure the processing system to:
        receive a request for transferring an ET from a first account associated with a first user to a second account associated with a second user, the first account being associated with a first ownership block of a first ownership block chain;
        generate a transaction block for the transaction block chain, the transaction block being associated with a first set of two random identification numbers, a first random identification number of the two random identification numbers being generated for and assigned to the transaction block, and a second random identification number of the two random identification numbers being further associated with the first ownership block associated with the first user;
        generate a second ownership block associated with the first user, the second ownership block being associated with a second set of random number identifications, a first random identification number of the second set being the first random identification number of the first set and a second random identification number of the second set being generated for and assigned to the second ownership block;
        generate a third ownership block associated with the second user, the third ownership block being associated with a third set of random identification numbers, a first random identification number of the third set being the first random identification number of the first set and a second random identification number of the third set being generated for and assigned to the third ownership block; and
        securely maintain the transaction block, the first ownership block, the second ownership block, and the third ownership block at an independent institution independent of the plurality of authorized financial institutions,
    wherein the first user of the plurality of users purchases the ET from at least one authorized financial institution of the plurality of authorized financial institutions.

2. The system of claim 1, wherein generation of the transaction block, the first ownership block, and the second ownership block are performed securely, to prevent unauthorized access to and use of the ET system, via a public/private key encryption security protocol to exchange data files.

3. The system of claim 2, wherein the ET system comprises a secure random number identification database maintained by the independent institution for the plurality of authorized financial institutions,
    wherein the independent institution comprises an Electronic Token Transfer Treasury (ETTT).

4. The system of claim 3, wherein the ETTT handles all ET transactions for the plurality of authorized financial institutions instead of each authorized financial institution of the plurality of authorized financial institutions.

5. The system of claim 1, wherein the first account and the second account are held by their respective authorized financial institutions of the plurality of authorized financial institutions, and are respectively accessible on-line by the first user and the second user.

6. The system of claim 1, further comprising banking ET system software enabling any user of the plurality of users to redeem their respective ETs for funds at any authorized financial institution of the plurality of authorized financial institutions.

7. The system of claim 1, wherein once in the transaction block chain, funds for ETs or ETs for funds transactions are conducted outside the plurality of authorized financial institutions.

8. The system of claim 1, wherein the transaction block and the first ownership block are stored via a write-protected memory.

9. The system of claim 8, wherein the write-protected memory comprises at least one of:
    a write-once, read many (WORM) memory; or
    a read-only memory (ROM).

10. A method for securely documenting a financial transaction between a plurality of users and between the plurality of users and a plurality of authorized financial institutions, comprising:
    creating an electronic token (ET) by at least one of the plurality of authorized financial institutions, in exchange for funds or an equivalent monetary value of the ETs;
    receiving a request for transferring the ET from a first account associated with a first user to a second account associated with a second user, the first account being associated with a first ownership block of a first ownership block chain;
    generating a transaction block for a transaction block chain, the transaction block being associated with a first set of two random identification numbers, a first random identification number of the two random identification numbers being generated for and assigned to the transaction block, and a second random identification number of the two random identification numbers being further associated with the first ownership block associated with the first user;
    generating a second ownership block associated with the first user, the second ownership block being associated with a second set of random number identifications, a first random identification number of the second set being the first random identification number of the first set and a second random identification number of the second set being generated for and assigned to the second ownership block;

generating a third ownership block associated with the second user, the third ownership block being associated with a third set of random identification numbers, a first random identification number of the third set being the first random identification number of the first set and a second random identification number of the third set being generated for and assigned to the third ownership block; and securely maintaining the transaction block, the first ownership block, the second ownership block, and the third ownership block at an independent institution independent of the plurality of authorized financial institutions, wherein the first user of the plurality of users purchases the ET from the at least one authorized financial institution of the plurality of authorized financial institutions.

11. The method of claim 10, wherein generation of the transaction block, the first ownership block, and the second ownership block are performed securely, to prevent unauthorized access to and use of the ET system, via a public/private key encryption security protocol to exchange data files.

12. The method of claim 10, wherein the transaction block and the first ownership block are stored via a write-protected memory.

13. The method of claim 12, wherein the write-protected memory comprises at least one of:
a write-once, read many (WORM) memory; or
a read-only memory (ROM).

14. The method of claim 10, wherein the first account and the second account are held by their respective authorized financial institutions of the plurality of authorized financial institutions, and are respectively accessible on-line by the first user and the second user.

15. The method of claim 10, further comprising providing banking ET system software enabling any user of the plurality of users to redeem their respective ETs for funds at any authorized financial institution of the plurality of authorized financial institutions.

16. A computer-readable storage medium having program instructions recorded thereon that, when executed by at least one processor of a processing system, perform a method for securely documenting a financial transaction between a plurality of users and between the plurality of users and a plurality of authorized financial institutions, the method comprising:

creating an electronic token (ET) by at least one of the plurality of authorized financial institutions, in exchange for funds or an equivalent monetary value of the ETs;

receiving a request for transferring the ET from a first account associated with a first user to a second account associated with a second user, the first account being associated with a first ownership block of a first ownership block chain;

generating a transaction block for a transaction block chain, the transaction block being associated with a first set of two random identification numbers, a first random identification number of the two random identification numbers being generated for and assigned to the transaction block, and a second random identification number of the two random identification numbers being further associated with the first ownership block associated with the first user;

generating a second ownership block associated with the first user, the second ownership block being associated with a second set of random number identifications, a first random identification number of the second set being the first random identification number of the first set and a second random identification number of the second set being generated for and assigned to the second ownership block;

generating a third ownership block associated with the second user, the third ownership block being associated with a third set of random identification numbers, a first random identification number of the third set being the first random identification number of the first set and a second random identification number of the third set being generated for and assigned to the third ownership block; and securely maintaining the transaction block, the first ownership block, the second ownership block, and the third ownership block at an independent institution independent of the plurality of authorized financial institutions wherein the first user of the plurality of users purchases the ET from the at least one authorized financial institution of the plurality of authorized financial institutions.

17. The computer-readable storage medium of claim 16, wherein the first account and the second account are held by their respective authorized financial institutions of the plurality of authorized financial institutions, and are respectively accessible on-line by the first user and the second user.

18. The computer-readable storage medium of claim 16, wherein generation of the transaction block, the first ownership block, and the second ownership block are performed securely, to prevent unauthorized access to and use of the ET system, via a public/private key encryption security protocol to exchange data files.

19. The computer-readable storage medium of claim 16, wherein the transaction block and the first ownership block are stored via a write-protected memory.

20. The computer-readable storage medium of claim 19, wherein the write-protected memory comprises at least one of:
a write-once, read many (WORM) memory; or
a read-only memory (ROM).

* * * * *

UNITED STATES PATENT AND TRADEMARK OFFICE
CERTIFICATE OF CORRECTION

Page 1 of 1

PATENT NO.         : 11,710,122 B2
APPLICATION NO.    : 17/193361
DATED              : July 25, 2023
INVENTOR(S)        : Michael R. Arneson et al.

It is certified that error appears in the above-identified patent and that said Letters Patent is hereby corrected as shown below:

On the Title Page

In item (73), in Column 1, in "Assignee", Line 1:
Delete "MATRICS2, LLC" and insert -- MATRICS2, INC. --.

Signed and Sealed this
Twenty-seventh Day of August, 2024

Katherine Kelly Vidal
*Director of the United States Patent and Trademark Office*